United States Patent
Dzoba et al.

(10) Patent No.: US 7,055,136 B2
(45) Date of Patent: *May 30, 2006

(54) CONFIGURABLE DEBUG SYSTEM WITH DYNAMIC MENUS

(75) Inventors: Jonathan Dzoba, Sugarland, TX (US); Paul Gingrich, Toronto (CA); Edmund Sim, Toronto (CA)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 100 days.

(21) Appl. No.: 09/798,095

(22) Filed: Mar. 2, 2001

(65) Prior Publication Data
US 2002/0004933 A1 Jan. 10, 2002

Related U.S. Application Data

(60) Provisional application No. 60/186,342, filed on Mar. 2, 2000, provisional application No. 60/186,341, filed on Mar. 2, 2000, provisional application No. 60/186,340, filed on Mar. 2, 2000, provisional application No. 60/186,339, filed on Mar. 2, 2000, and provisional application No. 60/186,326, filed on Mar. 2, 2000.

(51) Int. Cl.
*G06F 9/44* (2006.01)

(52) U.S. Cl. .............. 717/125; 717/100; 717/106; 717/124

(58) Field of Classification Search ............... 717/125, 717/100, 106, 124
See application file for complete search history.

(56) References Cited

U.S. PATENT DOCUMENTS

| | | | |
|---|---|---|---|
| 5,828,824 A | | 10/1998 | Swoboda |
| 6,042,614 A | * | 3/2000 | Davidson et al. ............ 717/116 |
| 6,282,701 B1 | * | 8/2001 | Wygodny et al. ............ 717/125 |
| 6,314,530 B1 | * | 11/2001 | Mann ........................... 714/38 |
| 6,324,684 B1 | * | 11/2001 | Matt et al. .................... 717/124 |
| 6,425,101 B1 | * | 7/2002 | Garreau ........................ 714/727 |
| 6,452,616 B1 | * | 9/2002 | De Vito et al. .............. 345/825 |
| 6,567,933 B1 | * | 5/2003 | Swoboda et al. .............. 714/31 |

OTHER PUBLICATIONS

Hutchings, Brad and Nelson, Brent, "Developing and Debugging FPGA Applications in Hardware with JHDL", p. 554–558, 1999 IEEE, retrieved from IEEE database Nov. 30, 2003.*

Taner, A. H., Brignell, J. E., "The Role of the Grphical User Interface in the Development of Intelligent Sensor Systems", p. 3/1 3/6, The Institution of Electrical Engineers, 1995, retrieved from IEEE database Nov. 30, 2003.*

(Continued)

*Primary Examiner*—Wei Y. Zhen
*Assistant Examiner*—Mary J Steelman
(74) *Attorney, Agent, or Firm*—William W. Holloway; W. James Brady; Frederick J. Telecky, Jr.

(57) ABSTRACT

The invention relates to a software system and method for dynamically varying context sensitive menus of a software system. In this method, a menu item is added to a context sensitive menu of a graphical user interface (GUI) at the request of a subsystem module. Then, an activation event for the context sensitive menu is received from the GUI. The added menu item is displayed as either active or inactive based on a response to a query from the software system to a second subsystem module. The action associated with the menu item specified by the first subsystem module is executed when the menu item is selected only if it is active.

14 Claims, 25 Drawing Sheets

OTHER PUBLICATIONS

Vanthienen, Jan and Poelmans, Stephan, "A General Framework for Positioning, Evaluating and Selecting the New Generation of Development Tools", p. 233–240, IEEE 1996, retrieved from IEEE database Nov. 30, 2003.*

Product Bulletin, *Code Composer Studio™ Integrated Development Environment,* Texas Instruments Incorporated, Feb. 14, 2001.

White Paper SPRA520. *Code Composer Studio White Paper.* Texas Instruments Incorporated. DSP Solutions, May, 1999.

User's Guide, *Code Composer Studio User's Guide,* Texas Instruments Incorporated, Literature No. SPRU328B. Feb., 2000.

* cited by examiner

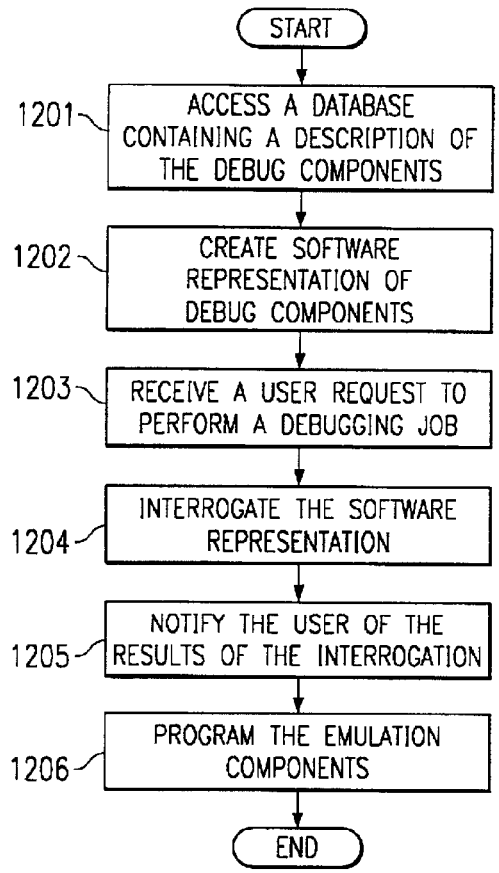
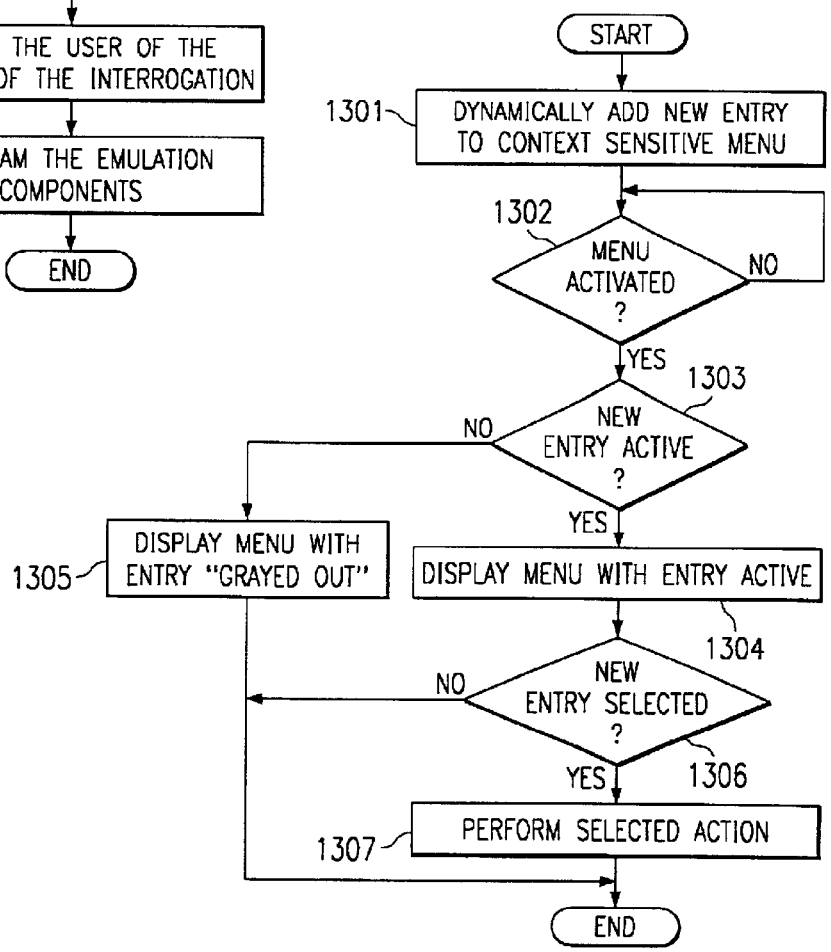

CONFIGURABLE DEBUG SYSTEM WITH DYNAMIC MENUS

This application is related to and claims priority under 35 USC §119 (e)(1) to the following Provisional Applications, all of which were filed concurrently Mar. 2, 2000:

Ser. No. 60/186,326, System and Method for Controlling System Hardware; Ser. No. 60/186,339, Wire List Walking; Ser. No. 60/186,340 Source and Data Objects; Ser. No. 60/186,341 Task Oriented GUI; Ser. No. 60/186,342 Dynamic Menus.

TECHNICAL FIELD OF THE INVENTION

The present invention relates to software and hardware testing environments, and more particularly to software and hardware testing tools for debugging systems that include one or more processing units or microprocessors.

BACKGROUND OF THE INVENTION

As advances are made in the technology for manufacturing integrated circuits, the capability and complexity of hardware and software for embedded systems increases. This continual increase in capability and complexity brings a continuing challenge for the software development tools used to create and debug applications for embedded hardware.

Embedded systems developers are facing a problem of "vanishing visibility". It is increasingly harder to see in real time what's happening within an application, due to higher processor speeds, higher integration levels, and larger on-chip caches. "System-on-a-chip" solutions are incorporating more and more ASIC peripherals. Capabilities that used to be off-chip, and easily accessible for monitoring with logic analyzers, are now on-chip. The more traditional solutions of using logic analyzers and in-circuit emulators are quickly becoming insufficient to support the debugging needs of today's developers.

In recent years, a partial solution to this problem has been introduced. JTAG emulation has replaced in-circuit emulation. A JTAG test port is integrated into the microprocessor permitting data to be moved on- and off-chip without interrupting the executing device. And, in some microprocessors, this capability is augmented with additional emulation logic to provide even greater visibility and access into registers and other internal functions such as on-chip cache memories.

Some software tools have been created to aid the developer in using this enhanced debugging capability but they have tended to be rather primitive. These tools are usually designed to work with only one hardware design and must be partially to completely rewritten each time a new design is introduced. Given the pace of technology change, modifying software debug tools or creating new ones for each new hardware innovation in embedded systems is prohibitively expensive. As such, these system have a hardware centric view.

In addition, these software tools tend to be limited in their capabilities and in their ease-of-use. They have generally been created by hardware designers who think in terms of registers, comparators, addresses, etc. instead of in terms of the tasks or jobs the developer wishes to accomplish. In other words, the tools are hardware-centric rather than user-centric. The software developer has to be familiar with how the hardware works to accomplish even simple tasks such as setting a breakpoint.

Finally, the "system-on-a-chip" solutions are introducing a new problem for the developers and users of the software debug tools targets for these solutions. Hardware designs are no longer limited to a few, set configurations. Hardware designers can vary the capabilities of their "system-on-a-chip" to meet the needs of the target application. Therefore, to avoid requiring the software developers to learn a new hardware architecture and a new set of debug tools each time, the debug tools need to adapt themselves to the capabilities of the hardware.

SUMMARY OF THE INVENTION

An illustrative embodiment of the present invention is a software system and method for dynamically varying context sensitive menus of a software system. A menu item is added to a context sensitive menu of a graphical user interface (GUI) in response to a call to the software system from a subsystem module. Then, an activation event for the modified context sensitive menu is received from the GUI. In response to this activation event, the added menu item is displayed as either active or inactive based on the response to a query from the software system to another subsystem module. The action associated with the added menu item is executed when it is selected only if the item is active.

In one embodiment of the invention, the step of adding a menu item is implemented by a call from the subsystem module to the software system with two functions as parameters. The step of displaying includes calling the first of these two functions to determine if the menu item should be displayed as active or inactive. And, the step of executing includes calling the second of the two functions to invoke the action associated with the menu item.

In another embodiment of the invention, the step of adding a menu item is further enhanced. First, a determination is made as to whether or not a resource is present to perform the action associated with that menu item. And, the menu item is only added to the context sensitive menu if the resource is present.

These and other features of the invention that will be apparent to those skilled in the art from the following detailed description of the invention, taken together with the accompanying drawings.

DESCRIPTION OF THE DRAWINGS

FIG. 12 presents a flow graph of a method for using debug components available on the target hardware during the debugging of an embedded application;

FIG. 13 presents a flow graph of a method allowing a plug-in of the software system of FIG. 1C to dynamically vary items in context sensitive menus;

Corresponding numerals and symbols in the different figures and tables refer to corresponding parts unless otherwise indicated.

DETAILED DESCRIPTION OF THE INVENTION

Figure 1A:
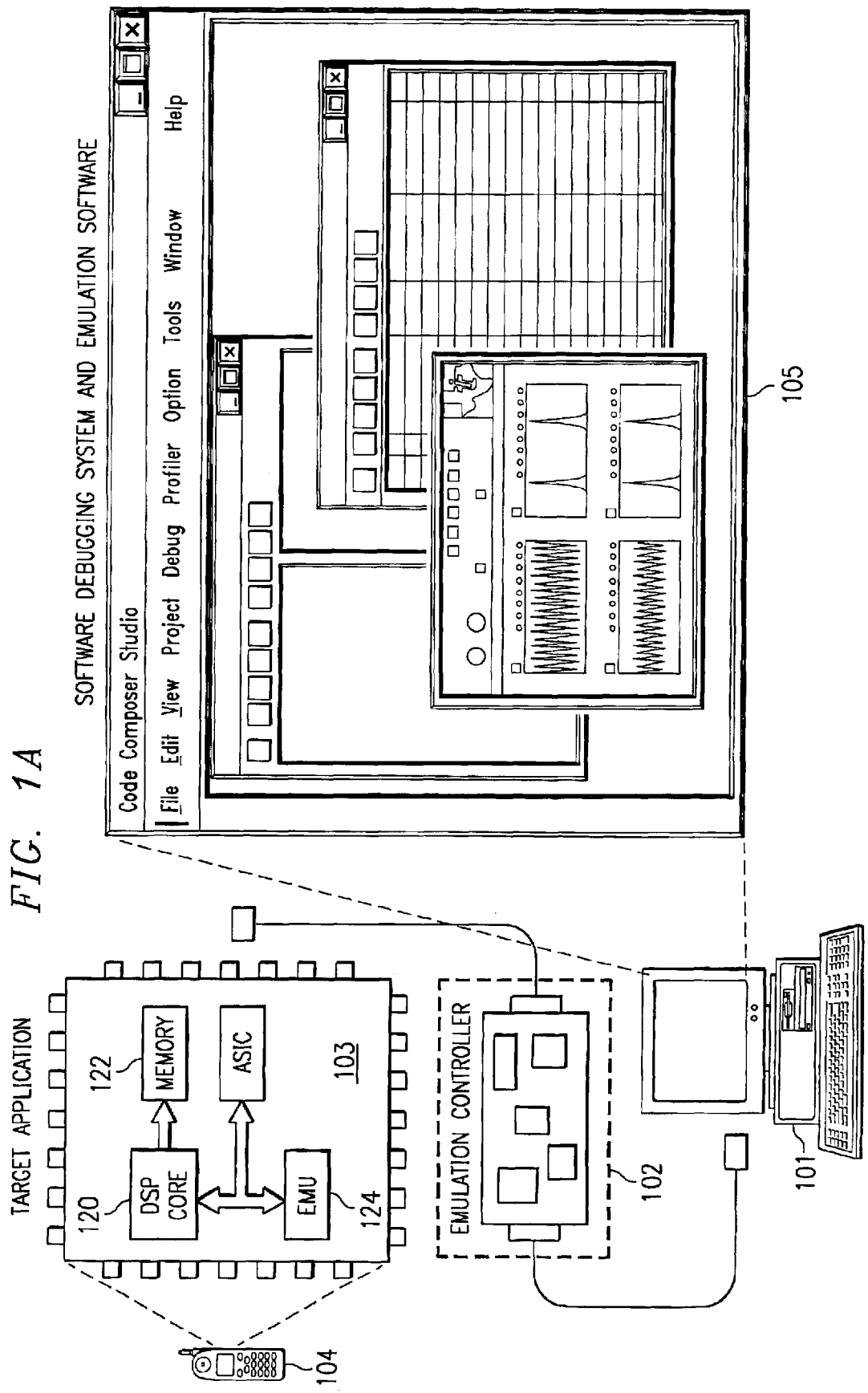
FIG. 1A illustrates the elements of an improved software development system for embedded applications.

FIG. 1A illustrates an embodiment of the present invention. The elements of an improved software development system for embedded applications are presented. General-purpose personal computer 101 is connected to target hardware 103 with emulation controller 102. Target hardware 103 is a megacell that includes emulation/debug logic 124 to support software debugging activities as well as digital signal processor (DSP) 120 and memory 122. Details of general construction of DSPs are well known and may be found readily elsewhere. For example, U.S. Pat. No. 5,072, 418 issued to Frederick Boutaud, et al, describes a DSP in detail. U.S. Pat. Nos. 5,329,471 and 5,828,824 issued to Gary Swoboda, et al, describes in detail how to test and emulate a DSP. Other aspects of testing and emulating an integrated circuit are included in a known standard, IEEE 1149.1-1990 or later revisions entitled Standard Test Access Port and Boundary Scan Architecture, which is also referred to as a JTAG test port. Improvements in IEEE 1149.1 are described in U.S. Pat. No. 5,828,824 issued to Gary Swoboda, entitled Method for Debugging an Integrated Circuit Using Extended Operation Modes and is incorporated herein by reference. Details of portions of target hardware 103 relevant to an embodiment of the present invention are explained sufficiently below, so as to enable one of ordinary skill in the art of creating software systems to support the debugging of embedded applications to make and use the invention.

DSP 120 is connected to memory 122, which holds the application program that is to be debugged. Debug logic 124 interacts with emulation controller 102 during the debugging of the application program. Typically, emulation controller 102 is connected to target hardware 103 through a JTAG test port. Personal computer 101 hosts a software development system that incorporates software debugging and emulation software with which the user interacts through user interface 105. Digital cellular telephone 104 is illustrative of one of the many ways in which the target hardware and accompanying software may be packaged DSP 120 is representative of any type of processor or microprocessor that can be included in other embodiments of the invention. Therefore, the present invention is not limited to DSP applications.

Figure 1B:
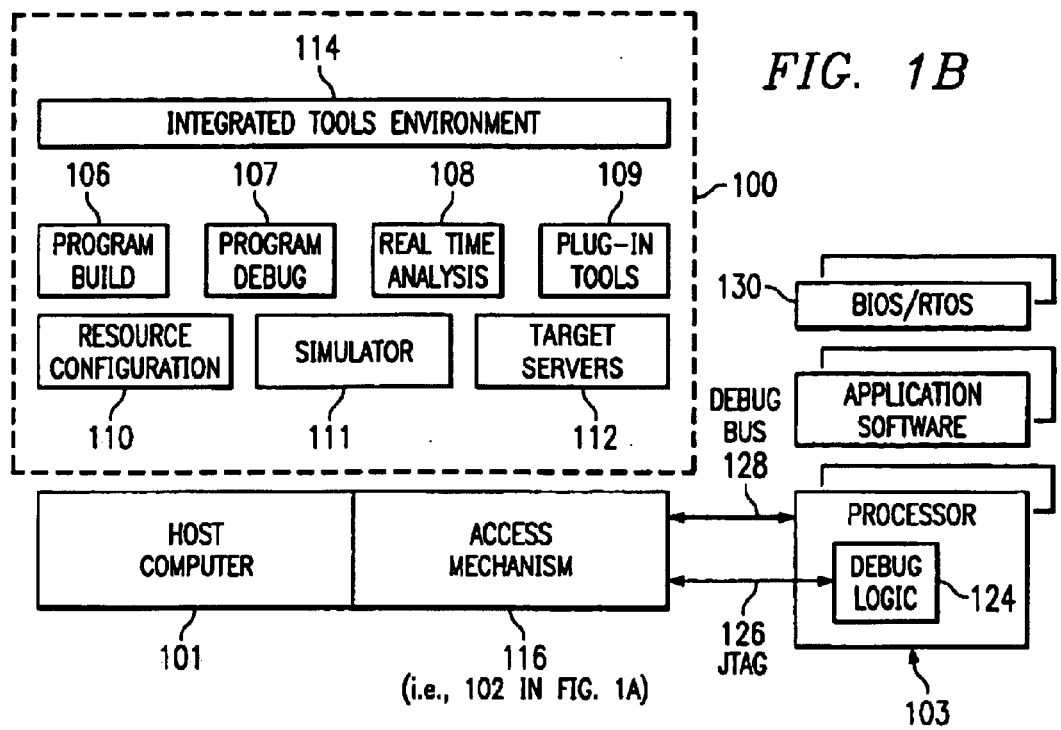
FIG. 1B is a block diagram of the logical architecture of the improved software development system of FIG. 1A.

FIG. 1B is a block diagram of the logical architecture of an embodiment of software development system 100 with user interface 105 that executes on personal computer 101. The software development system is comprised of a set of tightly integrated modules providing tools to support the entire software development process for DSP applications. At the top level, Integrated Tools Environment 114 comprises user interface 105, a source code editor, a code profiling tool, and a project management tool.

The second level of this architecture comprises the tools for generating code (block 106), for debugging code (block 107), and for analyzing the performance of the code in real-time (block 108). In addition, this level includes support for adding additional development tools as "plug-ins" (block 109). A "plug in" is a software application that may be dynamically added to the software development system to extend the functionality of the system.

The third level provides the low-level support for debugging. It comprises an instruction set simulator (block 111) for host debugging, software for configuring the debug resources available on the target hardware (block 110), and software for interfacing to the target hardware (block 112).

An access mechanism 116 connects the host computer and the system 103. In this embodiment, access mechanism 116 is embodied by emulation controller 102; however, in other embodiments, debug resources can be accessed by other means, such as by a system bus, or by a wireless infrared or radio link, for example. Commands are sent to debug logic 124 via JTAG test port 126. Trace data is received on a debug bus 128. In this embodiment, the debug bus is a Real Time Data Exchange (RTDX) bus, such as described in U.S. patent application Ser. No. 09/738,241, filed Dec. 15, 2000, entitled Data Exchange Method and System for Processors and is incorporated herein by reference. BIOS/RTOS 130 provides basic operating system support for the application as well as some low level support enabling the application to run in real-time while debugging information is collected.

In this embodiment, only a single target system 103 is illustrated; however, more than one target system, as indicated by the dashed boxes, can be connected to access mechanism 116 and controlled by the software development system.

Figure 1C:
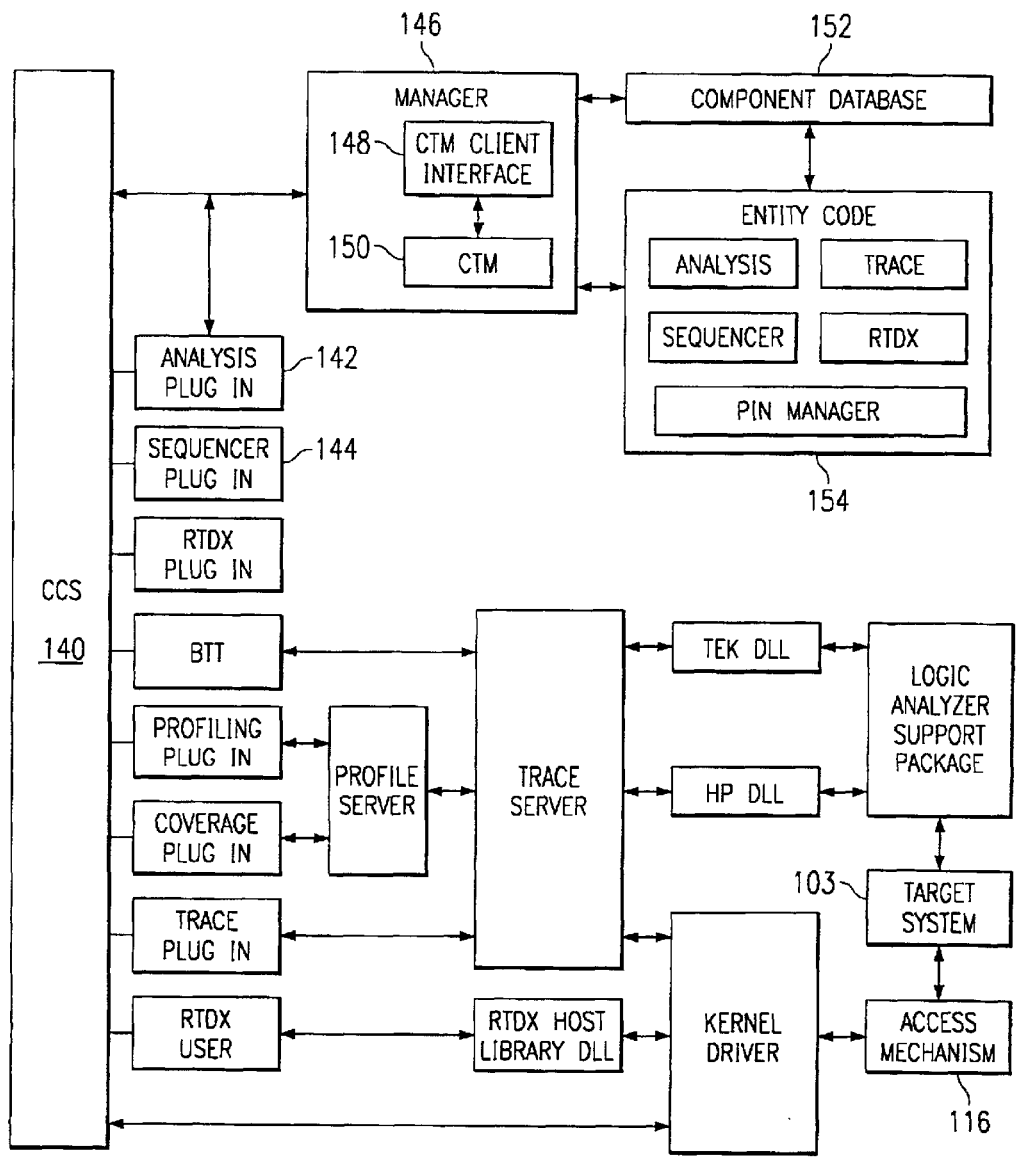
FIG. 1C is a more detailed block diagram of the logical architecture of the improved software development system.

FIG. 1C presents a more detailed view of the logical architecture of an embodiment of the present invention. Software development system 140 includes central management facility 146 for controlling the debug components available on target hardware 103. As discussed above, access mechanism 116 represents emulation controller 103 in this embodiment, but the invention is not restricted to use with an emulation controller. Plug-ins 142 and 144 communicate with central management facility 146 to use the debug components to perform debug jobs. Software development system 140 may be extended through the addition of other plug-ins that utilize the debug components provided those plug-ins conform to interface 148 of central management facility 146. Central management facility 148 makes it possible for plug-ins 142, 144 and future plug-ins to share the use of the components while preventing conflicts.

When software development system 140 is initialized, central management facility 146 access debug component database 152 to build a software representation of the debug components available on target 103. This software representation and the accompanying code for using that representation are represented by block 154. Central management facility 146 then works with code block 154 to determine what debug capabilities are supported by the debug components on target 103 and configure the user interface of software development system 140 to include only those menu items for debug tasks that may actually be performed with the available components.

A system and methods will now be described to provide a software development system and a user interface that has a software centric view. In this view, a user has certain debug tasks to be performed while debugging an embedded application program, such as: setting a breakpoint or watch point at a certain instruction, using a timer to determine if an interrupt service routine takes more than an allowable amount of time to execute, etc.

A software centric system is dependent on underlying hardware functionality, but not on a specific hardware implementation. When the debug component hardware (HW) is ported from one instruction set architecture (ISA) to the next, the HW implementation changes, but not the HW functionality. For example, a HW comparator compares the value of an input bus, such as the program address bus to a user chosen value, which is placed in a reference register. If the value on the bus and the value in the reference register are equal the output of the comparator will be true. If the values are different, the output of the comparator will be false. The size of the bus, and hence the size of the reference register, will vary from one ISA to the next. Hence one ISA may require 22 flip-flops to implement a reference register 22 bits wide, and another may require 32 flip-flops to implement a reference register 32 bits wide. Or the reference register size may be the same, but the implementation may be different due to the HW design considerations of a higher CPU clock rate. These are implementation differences, but the functionality remains the same: the output of the comparator is unaffected by the implementation of the reference register.

A hardware centric system requires the user to be aware of the programming details of the hardware implementation. In addition to placing a burden on the user by requiring the user to learn details of the hardware, the system must be modified each time the hardware implementation is changed. In this software centric view, the upper portions of the system such as the user interface are only concerned with the functionality of the hardware and are not aware of the implementation details. This allows the new GUI to be identical for all ISAs.

Figure 2:
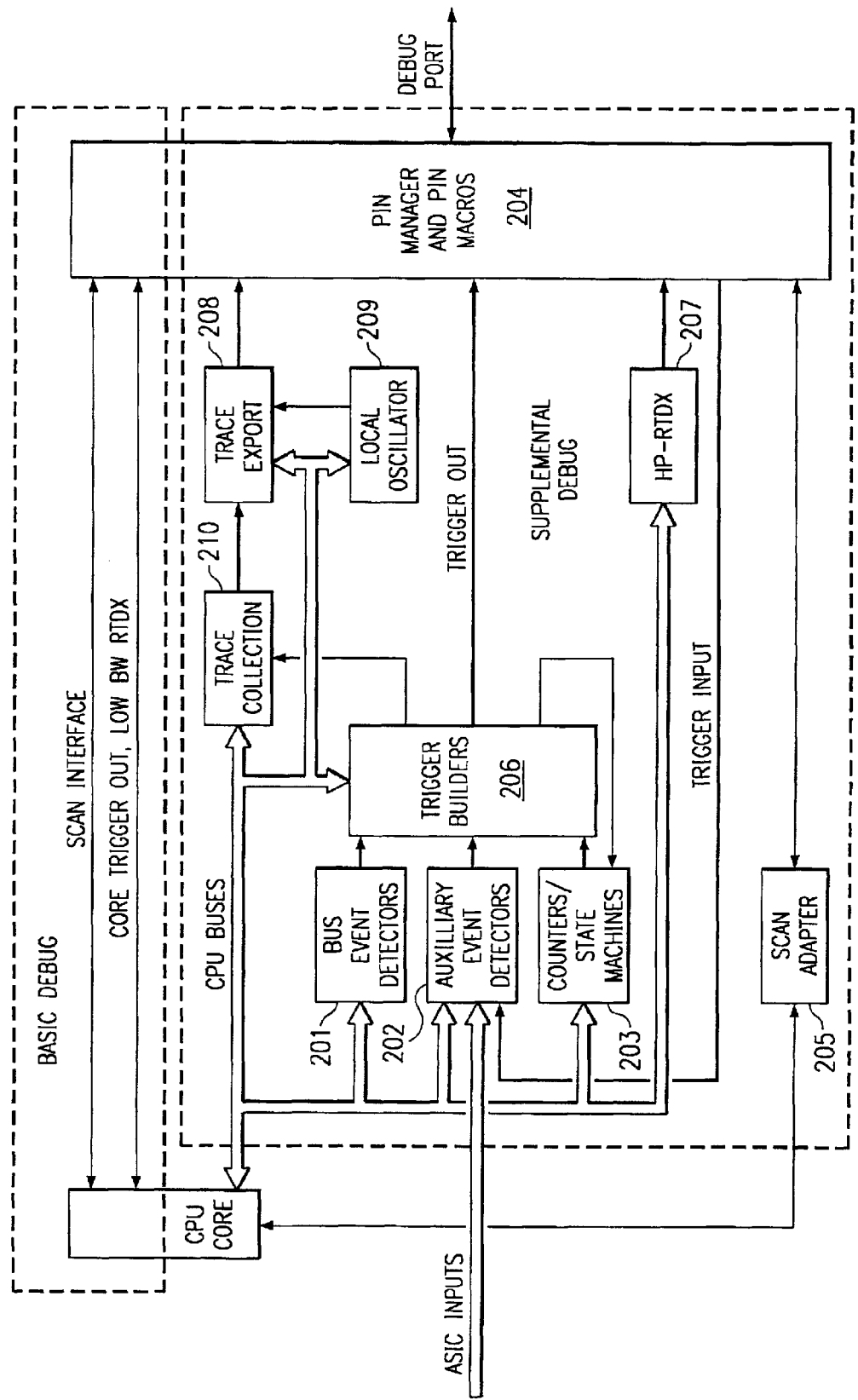
FIG. 2 is a block diagram of one possible configuration of debug components embodied in the target system of FIG. 1 that can be controlled by the software development system.

FIG. 2 presents one possible configuration of debug components provided on target hardware 103. These debug components comprise logic that monitors activity such as event detector 201 and auxiliary event detector 202, logic that records activity such as counters and state machines (block 203), logic that permits pin sharing such as scan adapter 205 and pin manager 204, logic that imports data such as RTDX 207, logic that accelerates transmission such as local oscillator 209, logic that exports data such as RTDX 207 and trace export 208, logic that captures execution activity such as trace collection 210, and logic that direct traffic such as trigger builder 206. The software development system allows the software developer to make use of these debug components during debug activities without requiring the developer to know anything about the capabilities of the debug components on target hardware 103. As debugging jobs are created, central management facility 146 and code block 154 determine if a job can be performed or not. As components are assigned to jobs or released when jobs are deleted, central management facility 146 tracks their usage and updates the menus of software development system 140 accordingly.

Figure 3:
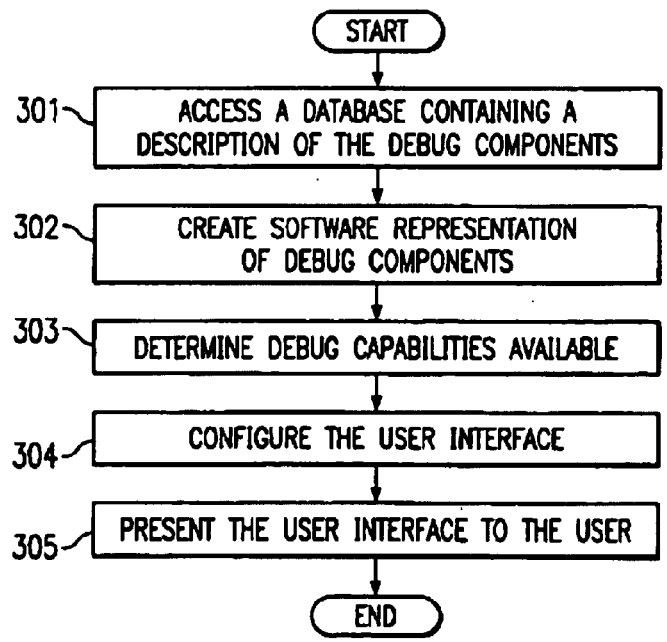
FIG. 3 presents a flow graph of a method for configuring the software development system of FIG. 1B upon initial activation.

FIG. 3 presents a flow graph of a method for configuring the software development system of FIG. 1B upon initial activation. According to an embodiment of the present invention, the debug software of the software development system is designed to be independent of the architecture of target hardware 103. This design allows the software development system to support multiple different target hardware configurations without change. When the software development system incorporating the debug software is activated, a debug component database containing a description of the configuration of the target hardware is accessed and the system configures itself to present to the user only those debug capabilities that are supported by the target hardware.

In step 301, a debug component database containing a description of the debug components available on the target hardware is accessed. In step 302, a software representation of these debug components and their interconnections is created from the contents of this database. In step 303, the software debugging system analyzes the capabilities of the debug components by traversing this software representation. In step 304, the user interface of the software debugging system is configured to present to the user only those capabilities that are provided by the debug components on the target hardware. In step 305, the user interface is presented to the user to begin the debugging session.

Software Wire List Walking

In an embodiment of the present invention, the software representation created in step 302 has a one-to-one relationship with the debug components on the target hardware. Each debug component is represented by a software module and the available interconnections among the components are reproduced by interconnections among the software modules. In essence, a software "wire list" is created and the debug software includes a generic algorithm that can "walk" this wire list dynamically to determine what debug components are available, how the components are interconnected, and as result, determine whether or not a capability should be presented to the user.

Figure 4:
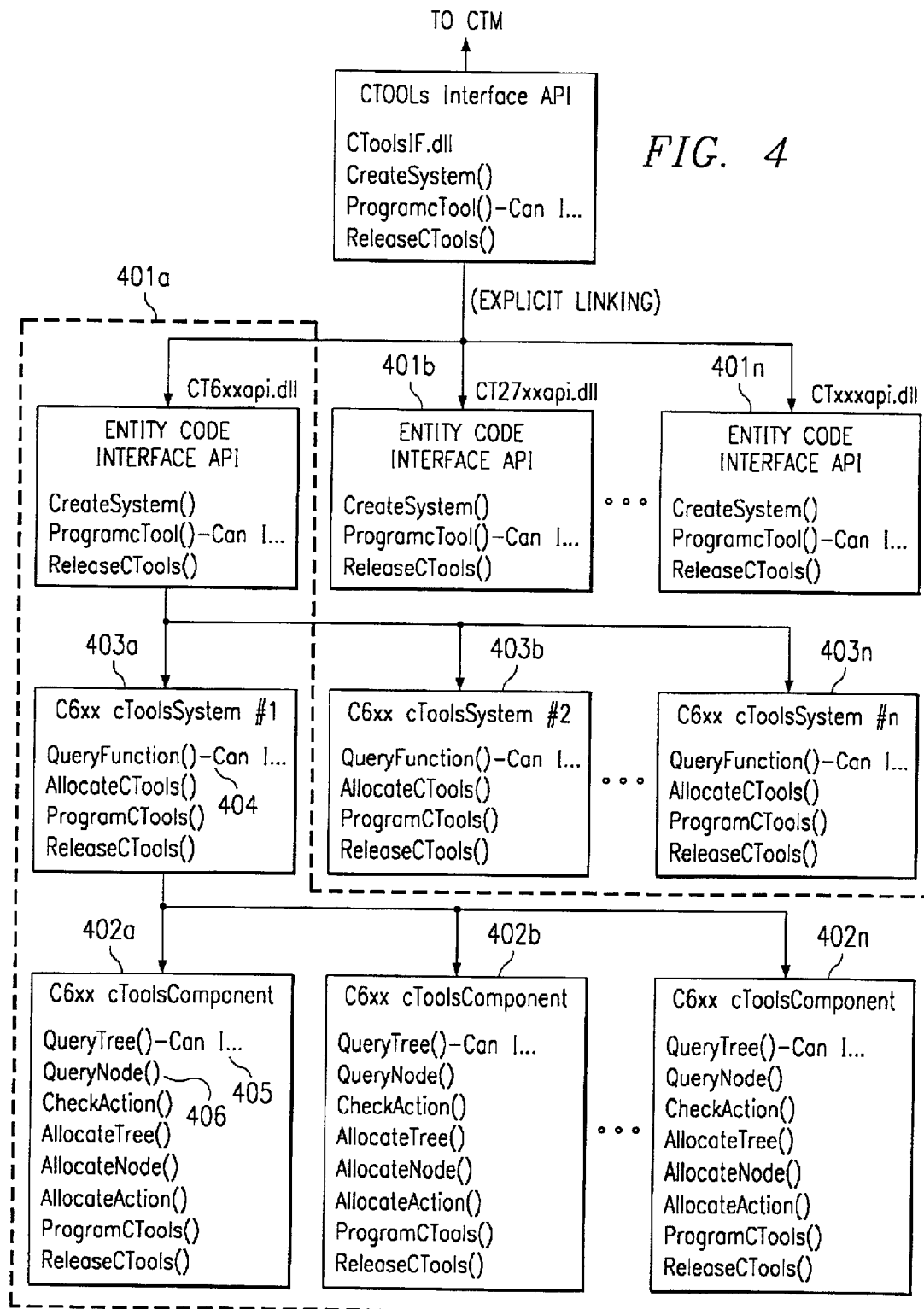
FIG. 4 illustrates the structure of a software representation of the debug components (wire list) that is created prior to the configuring of the software development system.

FIG. 4 illustrates the structure of this wire list in an embodiment of the present invention. This figure presents a class hierarchy for a C++ implementation of the wire list. Area 401a corresponds to the representation of one instruction set architecture (ISA). Areas 401b–n correspond to similar representations for other ISAs. Each debug component in the target hardware is represented by a component object 402a–n. For example, referring to FIG. 2, component object 402a might represent event detector 201, component object 402b might represent trigger builder 206, and component object 402n might represent a counter 203. Each component object 402n defines functions for reserving, programming, and releasing the debug component it represents. It also defines two functions that are part of the wire list walking implementation. QueryTree( ) function 405 is called to determine if the represented debug component can perform a requested operation. QueryTree( ) function 405 will call QueryNode( ) function 406 passing the task tree as a parameter. This function iterates through each node of the task tree to determine if it can perform the operation represented by that node. QueryNode( ) function 406 is also called by a component object 402n that represents a debug component capable of performing a Boolean operation to determine if the represented debug component can fulfill the requirements of an operand of a Boolean operation. System object 403a is the starting point of the wire list. It defines generic functions for reserving, programming, and releasing the debug components represented in the wire list. It also contains QueryFunction( ) 404 that is called to start the walking of the wire list. System objects 403b–n correspond to the starting points of other software wire lists that may be present. These wire lists represent other target hardware that may have the same ISA as that represented by system object 403a but the debug components available may vary.

This representation and the flexible architecture of the software development system allow the system to support multiple target hardware configurations without requiring any major changes to the software. The possible types of debug components are generally well known as discussed with reference to FIG. 2 and the software debugging system contains a class definition for each well-known type. As the representation is built from the debug component database containing the description of the target hardware, this class definition is used to create a component object 402a–n for each debug component of each type. If the target hardware contains more than one of a given component type, more than one component object is created using the same class definition.

If, in the future, a new type of debug component is created, support for it may be easily added to the system. For example, the introduction of a Static Random Access Memory (SRAM) comparator into the hardware does not require a software change, since the software already has the ability to set breakpoints and watchpoints using a point or range comparator. An SRAM comparator simply allows more points/ranges to be set with one debug component. The only change required will be the construction of a new class for the new component type.

At the other extreme, the addition of trace capability into the target hardware might require new software, a new class as discussed above, and software to display and manipulate the resulting data. The required new trace data and display software can be added as "plug in" to the software development system as presented in the discussion of FIGS. 1A and 1B above, requiring no change to the existing system software.

Referring again to FIG. 3, in step 303, the software development system uses the wire list walking software to determine what debug capabilities are supported. It iterates through a list of predefined debug jobs represented internally as analysis trees, processing each analysis tree to determine if the debug hardware can provide the functionality required by the debug job. The analysis tree is presented in more detail below in the discussion of the use of the software debugging system once it is activated.

Figure 5:
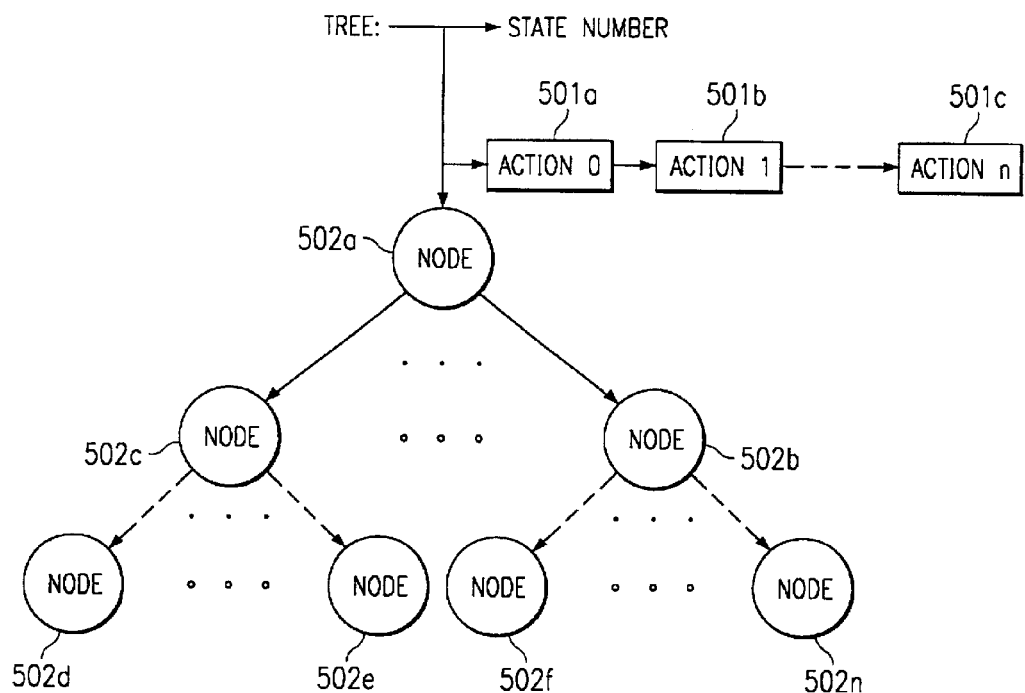
FIG. 5 presents the structure of a task tree that is input to the algorithm that "walks" the software wire list of FIG. 4 to determine if the debug components are available to perform the debug job represented by that task tree.

FIG. 5 presents the structure of a task tree. Each analysis tree is translated into a task tree by the wire list walking software. If a debug job includes multiple state, the State Number represents the state where the tree occurs. Each action 501a to 501n describes what to do if an event defined by a node 502a to 502n, or a combination of nodes, is triggered. Action 501a to 501n may be "halt CPU", "increment/decrement counter", "go to another state", "toggle a pin", etc. Each node 502a to 502n of the tree contains, among other things, a location to store an identifier for the debug component assigned to it by the wire list walking algorithm.

Figure 6:
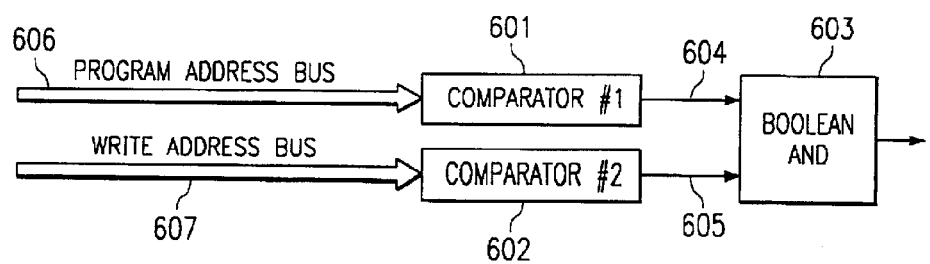
FIG. 6 presents a simple debugging job to illustrate the wire list walking algorithm.

FIG. 6 presents a simple debugging job to illustrate the wire list walking algorithm. Suppose the target hardware debug components include two comparators 601 and 602 that are connected to a Boolean AND block 603. The software wire list would have component objects 402n-1, 402n-2, and 402n-3 corresponding to components 601, 602, and 603, respectively. Interconnections 604, 605, 606, and 607 would be represented within the corresponding objects 402n-1–n-3. Suppose the job submitted is to halt the CPU when the Boolean AND of data from program address bus 606 and write address bus 607 match the user-specified bus values. The algorithm will start at the output side of this request and ask "Can any component halt the CPU?". The component 402n-1 that can halt the CPU would respond affirmatively. Then, the question is asked "Can any component do a Boolean AND?". The component object 402n-2 representing Boolean AND 603 would answer affirmatively. Then, starting with the input of Boolean AND 603, the interconnections 604 and 605 would be followed asking the question "Can anyone do a compare of the program address bus?" The component object 402n-3 representing comparator 601 would respond affirmatively. To complete this request, again from the input side the question would be asked of the interconnections "Can anyone do a compare of the write address bus?". The component object 402n-4 representing comparator 602 would respond affirmatively. The system now knows that the job can be performed as requested. Pointers to the component objects 402n-1, 402n-2, 402n-3, and 402n-4 that satisfy this job request will be stored in the appropriate nodes of the task tree representing this job.

Figure 7:
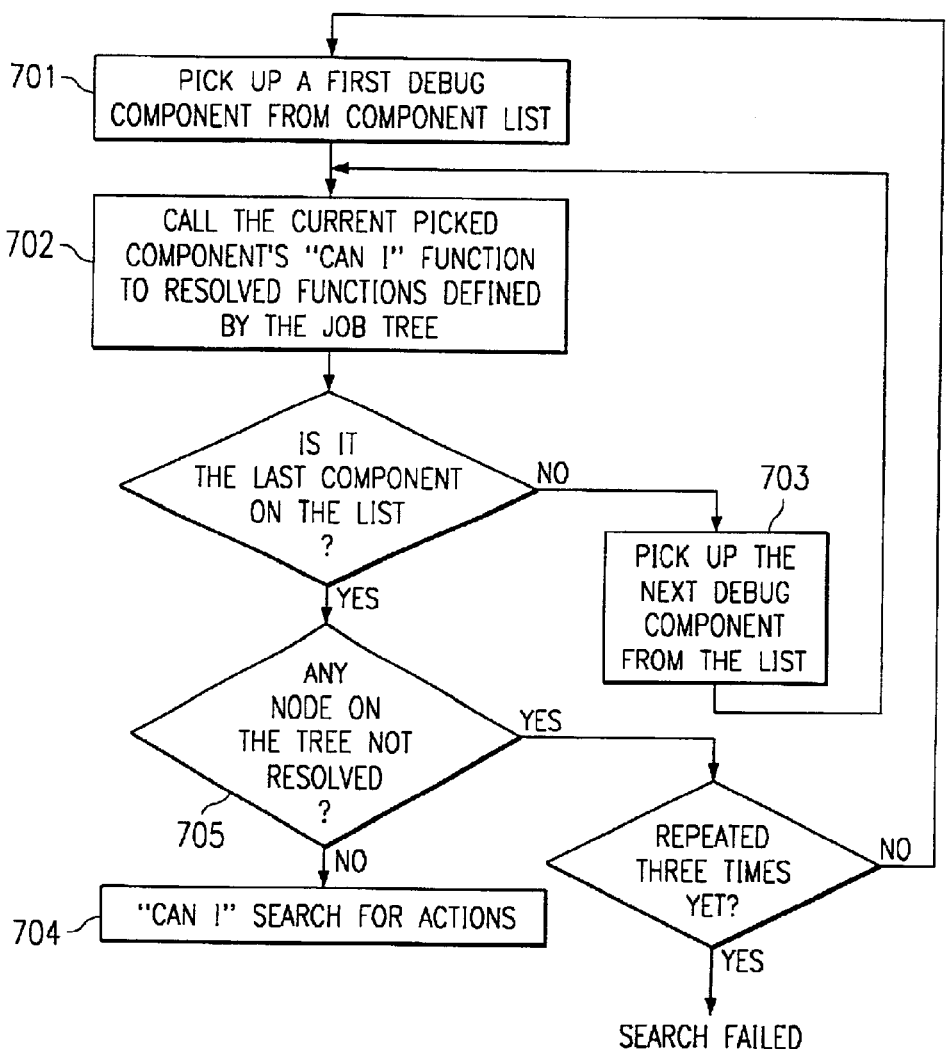
FIG. 7 presents a flow graph of the search process employed by the wire list walking algorithm.

FIG. 7 presents a flow graph of the search process employed by the wire list walking algorithm. Starting with system object 403 and the root node of the task tree, all available component objects in the system will be used as search entry points to find a best combination of debug components for the job represented by the task tree. At step 701, the first component object 402n in the hierarchy is selected. In step 702, QueryFunction( ) 404 will call QueryTree( ) function 405 of the selected component module 402n passing the task tree as a parameter. QueryTree( ) function 405 is known as the "can I" function of component object 402n. Each QueryTree( ) function 405 will call its own QueryNode( ) function 406 passing the task tree as a parameter. Upon return from the call to QueryNode( ) function 406, a check is made to see if all components have been checked. If the test result is false, step 703 is executed in which another component object is selected. The search process then continues at step 702. If the test result is true, a second test is made at step 705 to determine if any node in the task tree is unresolved. If the test result is true, the search process is started again at step 701. If the test result is false, all nodes are resolved, and step 704 is executed to search for actions.

Figure 8:
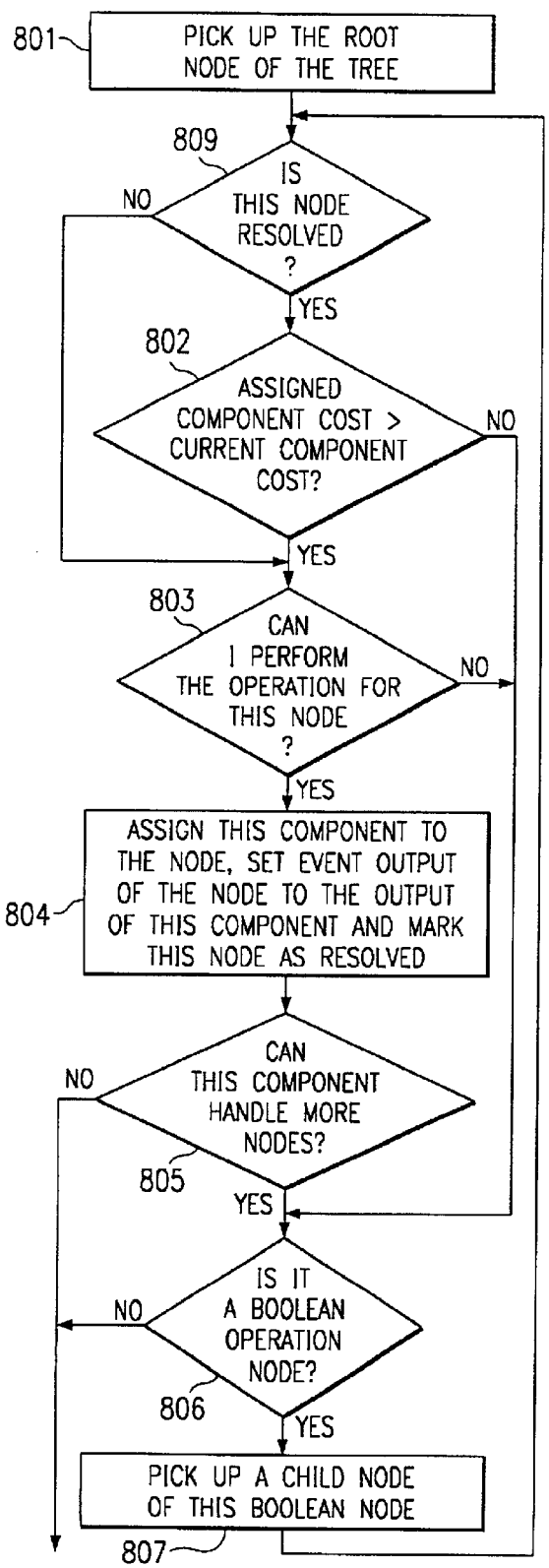
FIG. 8 contains a flow graph describing the iterative process followed by the wire list walking algorithm to determine if a debug component can perform the operation represented by a node of the task tree.

FIG. 8 contains a flow graph describing the iterative process QueryNode( ) function 406 follows to determine if it can perform the operation represented by that node. This process corresponds to step 702 in FIG. 7. In step 801, the root node of the task tree is selected. If the node is not resolved as per the test performed in step 809, the process continues with step 803. If it is resolved, at step 802, a check is made to determine if the cost of the debug component assigned to the node is greater than the cost of the current debug component. If it is not, the process continues at step 806. Otherwise, step 803 is performed.

Each component module has an assigned cost and the cost of a solution is the total cost of all the components included in the final solution. Cost is generally a matter of complexity. For example, an AND gate with three inputs is assigned a higher cost than an AND gate with two inputs. If the component cost of a component module already assigned to the node in question is greater than the cost of the current component module, then the current node is considered as a replacement. If it is determined that it can replace the assigned component module, then the current module becomes part of the candidate solution and the old assigned module is released. In this manner, when a final solution is found, it will be the lowest cost solution available.

At step 803, the test is made to determine if represented debug component can perform the operation required by this node of the task tree. If it cannot, the process continues at step 806. If it can, step 804 is performed in which the represented debug component is assigned to the node. Then, at step 805, a test is made to determine if the represented component has additional capacity. If it cannot, the process terminates and returns to step 702 in FIG. 7. If it can, step 806 is executed. At step 806, a test is made to determine if the task tree node is requesting a Boolean operation. If the test result is negative, the process terminates and returns to step 702 in FIG. 7. Otherwise, a child node of the Boolean operation node is selected and the process continues at step 809.

Figure 9:
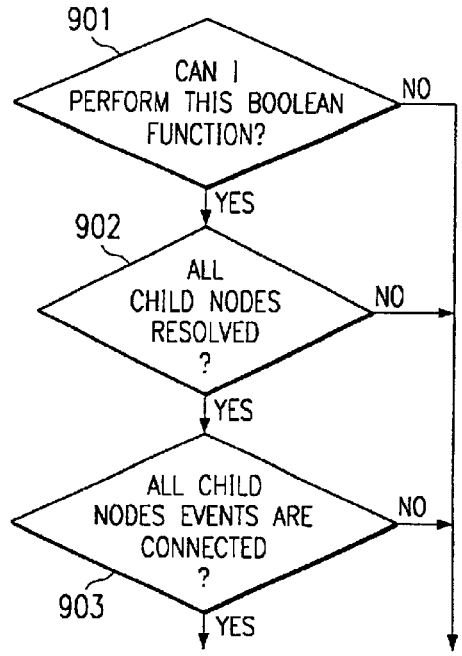
FIG. 9 illustrates the handling of a Boolean operation by the wire list walking algorithm.
Figure 10:
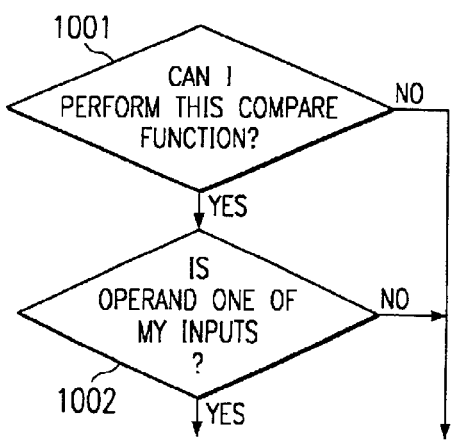
FIG. 10 represents the handling of a compare operation by the wire list walking algorithm.

FIGS. 9 and 10 are flow graphs of two of the possible tests performed at step 803 to determine if the represented component can perform the operation. FIG. 9 illustrates the handling of a Boolean operation and FIG. 10 represents the handling of a compare operation.

If component object 402n determines at step 901 that it can perform a requested Boolean operation, a test is then made at step 902 to determine if all child nodes of the Boolean operation are resolved. If the result of this test is positive, a test is made at step 903 to determine if all of the events for each child node are connected. If the results of the tests at steps 901–903 are all positive, a positive response is returned to step 803 in FIG. 8. If the result of any of these tests is negative, a negative response is returned to step 803. In this manner, each child node of the Boolean node in the task tree is picked up in turn and other component objects 402n are called via their respective QueryNode( ) functions with each child node as a parameter to find a component object for each child node. The search is successful only if all the child nodes may be handled by a group of interconnected component modules.

Alternatively, if component object 402n determines at step 1001 that it can perform a requested compare operation, it will check to see if the requested operand is one of the inputs to represented debug component at step 1002. If it is, a positive response is returned to step 803 in FIG. 8. If the result is negative in either step 1001 or step 1002, a negative result is returned to step 803.

If component module 402n represents a multiplexor, component object 402n will call the QueryNode( ) functions of its interconnected component objects passing the node it received as a parameter. If any function call returns a success, the search ends for the multiplexor component object.

Figure 11:
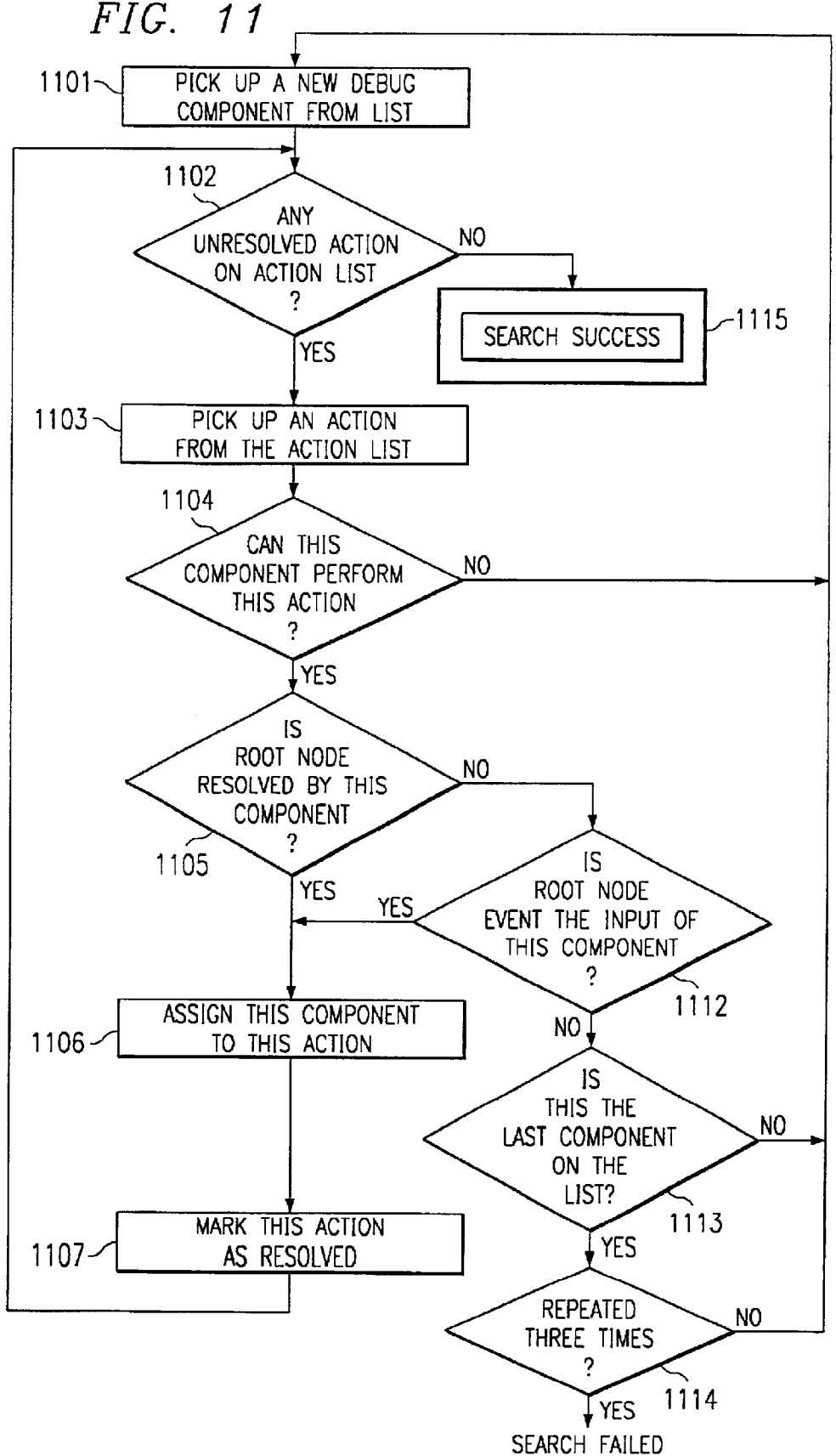
FIG. 11 presents a flow graph of the search process employed by the wire list walking algorithm to resolve actions defined in the task tree.

FIG. 11 presents a flow graph of the search process for resolving actions defined in the task tree. As represented by step 704 in FIG. 7, if the QueryNode( ) function 406 call for the root node of the task tree returns a success, QueryTree( ) function 405 will then determine if the actions defined by the task tree can be triggered. If all of the actions can be triggered, the search is successful.

At step 1101, a debug component is picked. A test is made at step 1102 to determine if there are any unresolved actions 501a–n. If the response to this test is negative, the search terminates successfully at step 1115. Otherwise, the next action 501n is picked up from the action list at step 1103. A test is made at step 1104 to determine if the current debug component can perform action 501n. If the response is negative, the process returns to step 1101 to get the next debug component. Otherwise, a test is made at step 1105 to see if the root node event is generated by the current component. If so, then this action is resolved. The current component is assigned to the action in step 1106 and the action is marked as resolved in step 1107. The search process then resumes with step 1102 to check for additional unresolved actions. If the test at step 1105 is negative, a test is made at step 1112 to determine if the root node event is generated by another debug component and the current component can take that event as input. If so, then the action is resolved and the process continues at step 1106. If not, a check is made at step 1113 to determine if there are more debug components to be tried. If so, the process resumes at step 1101 with the next debug component. Otherwise, a check is made at step 1114 to see if the search has been repeated three times. If not, the search starts again at step 1101 with the first debug component. After three unsuccessful searches through the debug components, the search terminates unsuccessfully.

Referring back to FIG. 3, in step 304, the user interface is configured to present to the user only those capabilities that have been detected in step 303. Menu items for those jobs most frequently performed by the user that have passed successfully through step 303 are dynamically added to certain of the context sensitive menus of the software debugging system. These context sensitive menus appear when the user makes selections in a source code window and clicks the right mouse button. This dynamic menu capability is explained in more detail below.

Using Debug Components

FIG. 12 presents a flow graph of a method for using debug components available on the target hardware during the debugging of an embedded application. In step 1201, as in step 301 of FIG. 3, a debug component database containing information regarding available debug components is accessed. These debug components may include counters, comparators, processors, logic gates, cores, boards, CPUs, pins, etc. The information comprises a list of the debug components, an identification for each of debug component, (e.g., a counter, a comparator, etc.), an identification of the inputs to and outputs from each component, and a list of interconnections between the components.

In one embodiment, the debug component database is generated manually. In another embodiment, the debug component information is dynamically generated by a software tool. The software tool will accept as input a file describing the layout of the target hardware. Such a file may be generated by the computer-aided design tool used by a hardware designer to lay out the target hardware. The software tool will use the information in this file to create a database describing the debug components available in the hardware design.

The debug component database containing the system resource information may be accessed in several ways. In one embodiment, the database may be accessed over a communications network, such as the Internet, an Ethernet, a Local Area Network, etc. In another embodiment, the database may accessed over a communication medium, such as FireWire (IEEE standard 1394), through parallel ports, by peripheral component interconnect ("PCI"), etc.

In step 1202, a software representation of the debug components is created. An embodiment is described in the discussion of step 302 of FIG. 3 above.

In step 1203, a user request is received. In an embodiment, this user enters a request through a graphical user interface (GUI) that presents a software-centric, user task oriented view of the debug capabilities of the target hardware. Given this view, the user may think in terms of the debug jobs to be accomplished based on the generic functionality of the debug components and not be concerned with the details of the actual hardware implementation of those components.

For example, a comparator debug component compares the value of an input bus, such as the program address bus to a user chosen value, which is placed in a reference register. If the value on the bus and the value in the reference register are equal, the output of the comparator is "true." If the values are different, the output of the comparator is "false." The size of the bus, and hence the size of the reference register, may vary from one target architecture to the next. One architecture may require 22 gates to implement a reference register 22 bits wide, and another may require 32 gates to implement a reference register 32 bits wide. Or the reference register size may be the same, but the implementation may be different due to the hardware design considerations of a higher CPU clock rate. These are implementation differences, but the functionality remains the same: the output of the comparator is unaffected by the implementation of the reference register.

In step 1204, the software representation is interrogated to determine if the system resources can perform the requested job. An embodiment of this interrogation process is presented in the discussion of software wire list walking associated with FIGS. 7–11 above.

In an embodiment, the wire list walking algorithm finds the lowest cost combination of available debug components that can perform the requested job. It also determines if one or more lower cost solutions are possible if debug components currently programmed by other jobs were made available. If such solutions are possible, the user is notified that a solution has been found but that a lower cost solution may be had if another job or jobs is canceled. The user then has the option of accepting the current solution or canceling the identified job or jobs and receiving an even lower cost solution.

According to one embodiment of the present invention, the requested debug components may be "reserved" after they are identified. This is done to prevent an operation identified as capable from being changed to impossible, or not possible until later. This may include reserving, or controlling access to, all system resources, or just the identified system resources.

In step 1205, the user is notified as to whether the requested job can be performed by the available debug components. This notification may indicate one of three things: the requested job can be performed; the requested job cannot be performed; or, the requested job could be performed but one or more of the debug components required by the job are in use by another job.

In step 1206, the system resources assigned to the debug job are programmed by transferring information such as data, programs, commands, signals, messages, or combinations thereof to the target hardware.

Dynamic Menus

Referring back to step 1203 in FIG. 12, using the GUI, the user may request debug jobs such as setting a hardware breakpoint, defining a watchpoint, and using a timer to determine if an interrupt service routine takes more than an allowable amount of time to execute. In an embodiment of the present invention, the user may request the more frequently executed jobs such as setting breakpoints or watchpoints through a context sensitive menu that may be activated with a right mouse click where the user spends most of his time while debugging—the source code window. The debug jobs that appear in this menu are selected when the software development system is initialized using the method described above in relation to FIG. 3. Furthermore, when the menu is activated, jobs are dynamically made active and available for user-selection or inactive and unavailable for user selection based on the context in which the activation occurs. For example, if a data variable is highlighted when the right mouse button is clicked, jobs that work with data variables will be displayed as active while any jobs that do not work with data variable will be "grayed out" to indicate that the jobs may not be selected in this context.

In an embodiment of the present invention, if a job listed in the context sensitive menu cannot be executed because one or more debug components required by it are no longer available, that job will be made inactive. It will only become active again when the required debug components become available. For example, if all of the comparator components are assigned to debug jobs, any debug job listed in this menu that requires the use of a comparator will become inactive.

FIG. 13 presents a flow graph of a method allowing a plugin of a software system to dynamically vary items in context sensitive menus. In step 1301, a plugin calls the software system to add a new menu item to a specified context sensitive menu. At step 1302, the modified menu is activated by the user. In step 1303, the software system queries the plugin to find out if the new menu item should be displayed as active or inactive. If the response is that the menu item should be made inactive, at step 1305, the menu is displayed with the item "grayed out". Otherwise, at step 1304, the menu is displayed with the item available for user selection. If the user selects this new menu item at step 1306, the software system calls the plugin to execute the selected action as indicated by step 1307.

In an embodiment of the present invention, the above method for dynamic menus is implemented by providing a common object model (COM) interface between the software development system and the debug software. COM is one type of commercially available object request broker. When the debug software adds a menu item at step 1301, it calls this interface and includes two functions in the parameters of the call. The first function is called by the software development system at step 1303 after the user clicks the right mouse button to activate the context sensitive menu in step 1302 and before the menu is displayed. This function tells the software development system whether the associated menu item should be displayed as active or inactive when the menu appears. This determination is made based on the context in which the menu is activated and the availability of the debug components required to execute the associated debug job. The second function is called by the software development if the user selects the menu item in step 1306. This second function executes the action associated with the menu item.

In an embodiment, the most common debug jobs supported by the debug components available in the target hardware are made available to the user in a context sensitive menu associated with a source code editor. The menu items available for selection on this menu are varied dynamically depending upon the context in which the menu is activated and the current availability of the required debug components. The contexts supported include selection of a data variable, selection of a single line of source code, selection of a contiguous block of source code, and current cursor position in the source code window.

If a data variable is highlighted in the source code window and the right mouse button is clicked, the context sensitive menu will make available to the user only those debug jobs that operate with a data variable. Any other debug jobs will appear as inactive menu items. Analogously, if a single line of source code or a contiguous block of source code is highlighted when the right mouse button is clicked, only those debug jobs that operate in the selected context will be made available to the user. The menu items made active or inactive may vary based on the selection of a single line of source code or a contiguous block of source code. If nothing is highlighted in the source code window when the right mouse button is clicked, the source code line nearest to the position of the cursor in the window is used as the default context.

Figure 14A:
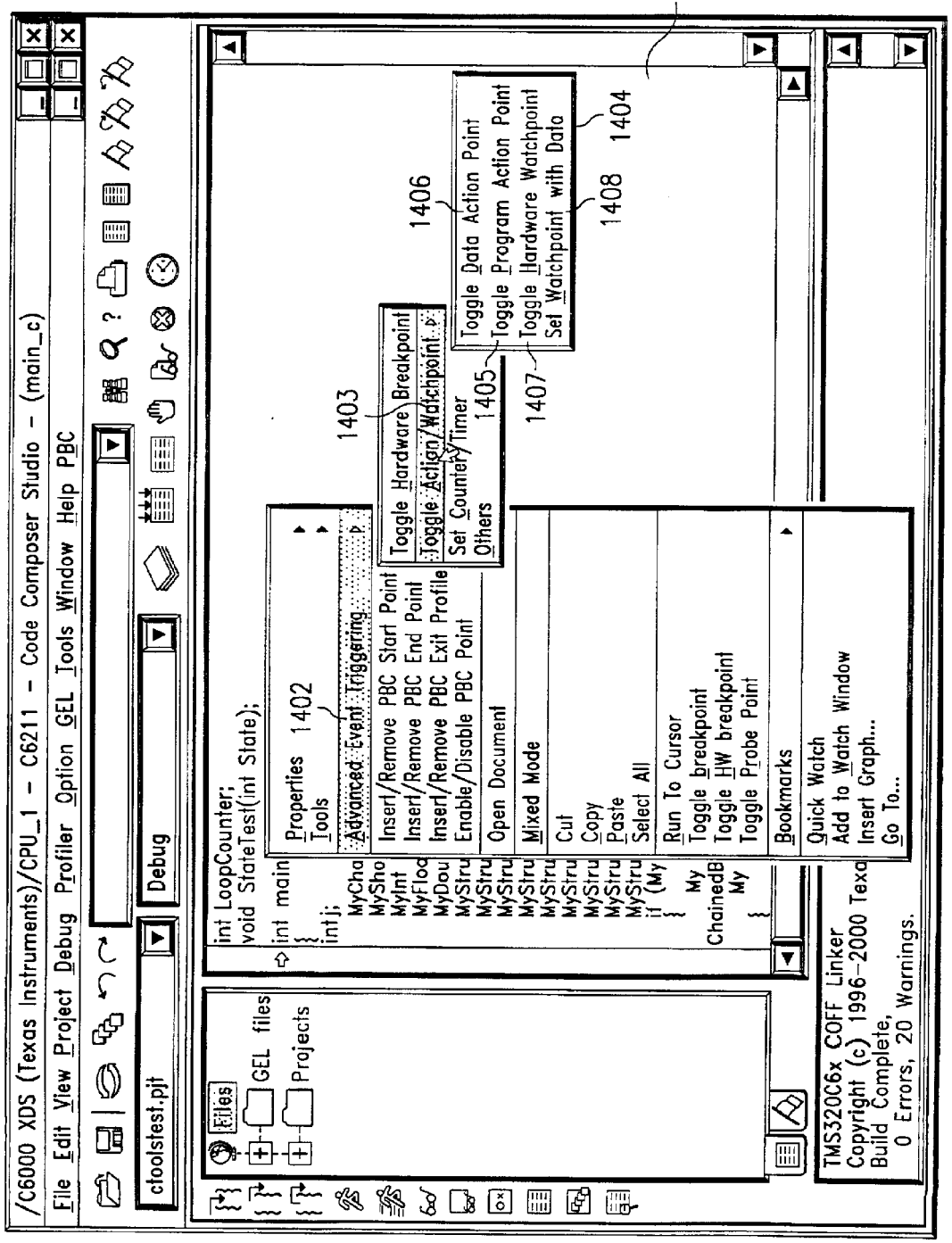
FIGS. 14A and 14B illustrate the dynamic menu capability, showing a source code editor window containing the source code for an application program this being executed on the target processor of FIG. 1.
Figure 14B:
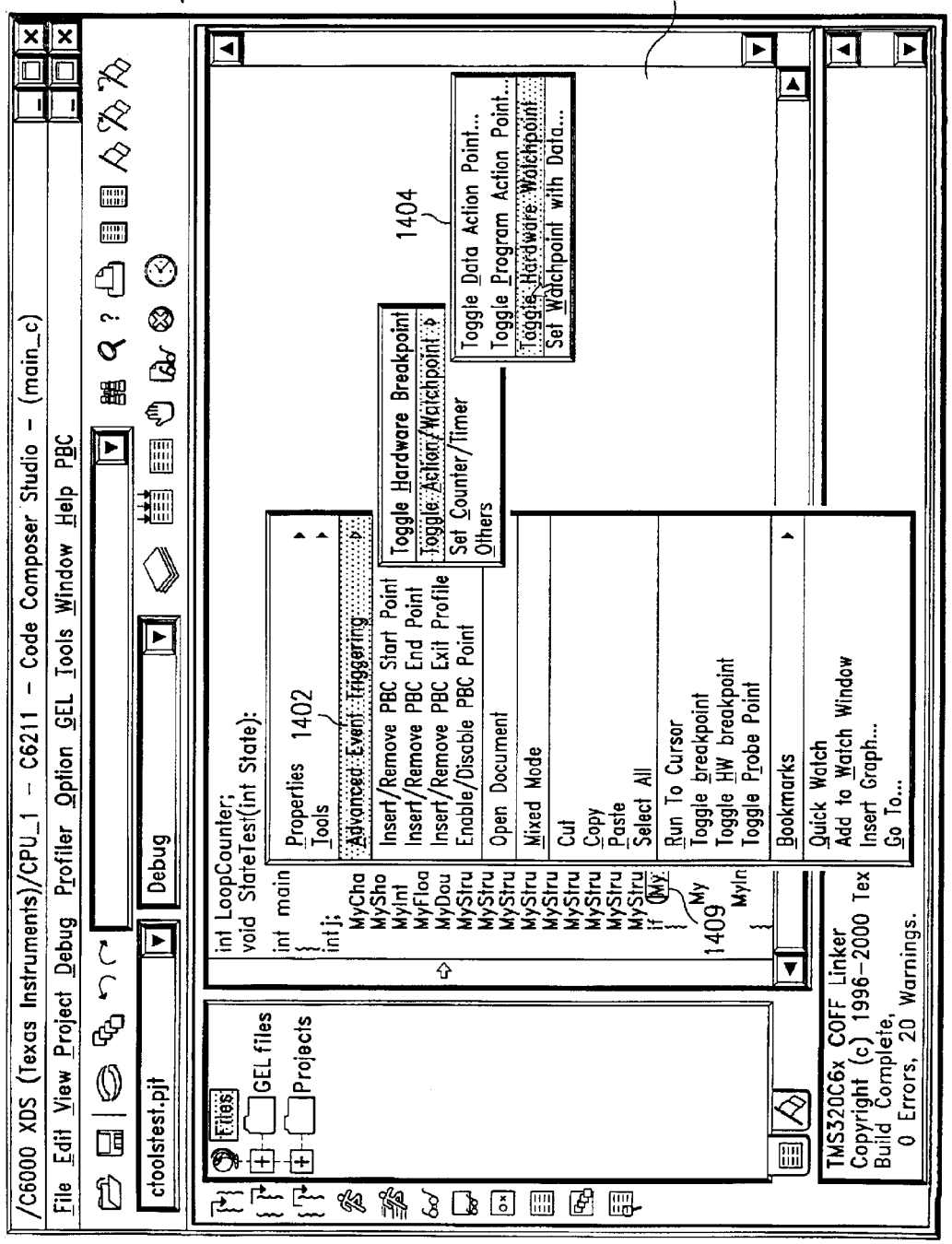

FIGS. 14A and 14B illustrate an embodiment of the dynamic menu capability. These figures show a source code editor window containing source code for an application program that is being executed on target processor 120. In FIG. 14A, nothing was highlighted in source code window 1401 and the right mouse button was clicked. The user has selected menu item 1402 for the Advanced Event Triggering option followed by a selection of menu item 1403 for the Toggle Action/Watchpoint option. At this point, menu 1404 is displayed and only those jobs that may be performed with a source code line are active. In this instance, only job 1405 is active and jobs 1406, 1407, and 1408 are "grayed out" to indicate that they are not available for selection because they do not apply to the source code context. In FIG. 14B, the user has highlighted data variable 1409 and clicked the right mouse button. The identical selection sequence has been followed as in the discussion above resulting in the display of menu 1404. In this instance, all four jobs in menu 1404 are available for selection as they may all be performed with a data variable.

Source and Data Objects

In an embodiment, the selected source code context is represented internally as a data object if the context is a data variable or as a source object if the context is one line or a range of lines of source code. These internal representations encapsulate the relevant debugging information associated with the context such as start address, length, type, etc. This list of possible relevant debugging information is intended to be representative, not exclusive. The debugging information is supplied by the software development system, which is uniquely positioned to create, retain, and update it as the application is edited, compiled and/or assembled, and linked. When the application is compiled/assembled and linked, a file in common object file format (COFF) is created that contains, among other things, symbolic information to be used by the debugging software.

When the user selects a debug job, information is extracted from the internal representation associated with the selected context and used to fill one or more parameters of the job. This capability frees the user from having to know or look up the relevant debugging information when defining a debug job. However, the user is not limited to this method of filling in parameters. The user may choose to manually enter the parameter values instead.

In addition, these internal representations are retained by the software development system and are updated if the source code that they represent is modified. This feature permits the user to make modifications to source code during a debugging session without having to redefine all debug jobs created before the modification. Instead, any debug job referring to a source code context that has been subsequently modified is automatically updated when the modification is made.

Figure 15:
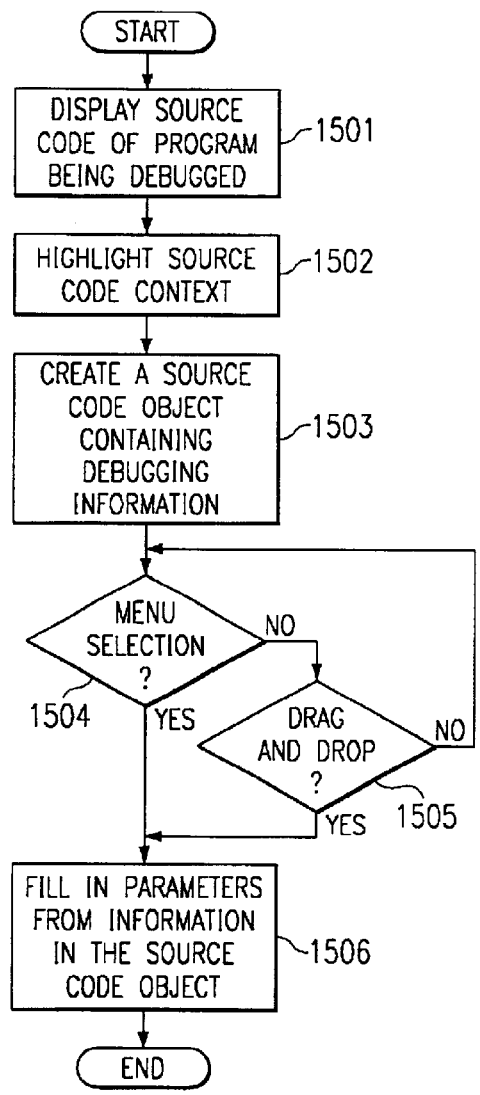
FIG. 15 illustrates a method for dynamically determining relevant debugging information from the source code of the application program being debugged.

FIG. 15 illustrates a method for dynamically determining relevant debugging information from the source code of the program being debugged. In step 1501, the source code of the program being debugged is displayed in a source code window of the software development system. In step 1502, the area of the source code in which the user wishes to specify some debug job is highlighted. This area may be a single line of code or a range of source code lines. A source code object containing relevant debugging information about the source code context selected is created in step 1503. The relevant debugging information is obtained from a COFF file containing debug information that is created by the software development system when the source code is compiled or assembled and linked to form the program. If a debug job is selected from a menu while the source code area is highlighted (step 1504), the information from the associated source code object is used to automatically fill in the parameters of the debug job (step 1506). Or, the highlighted area may be "dragged and dropped" onto a dialog box (step 1505) and the information from the associated source code object is used to fill in parameters in the dialog box (step 1506).

Figure 16A:
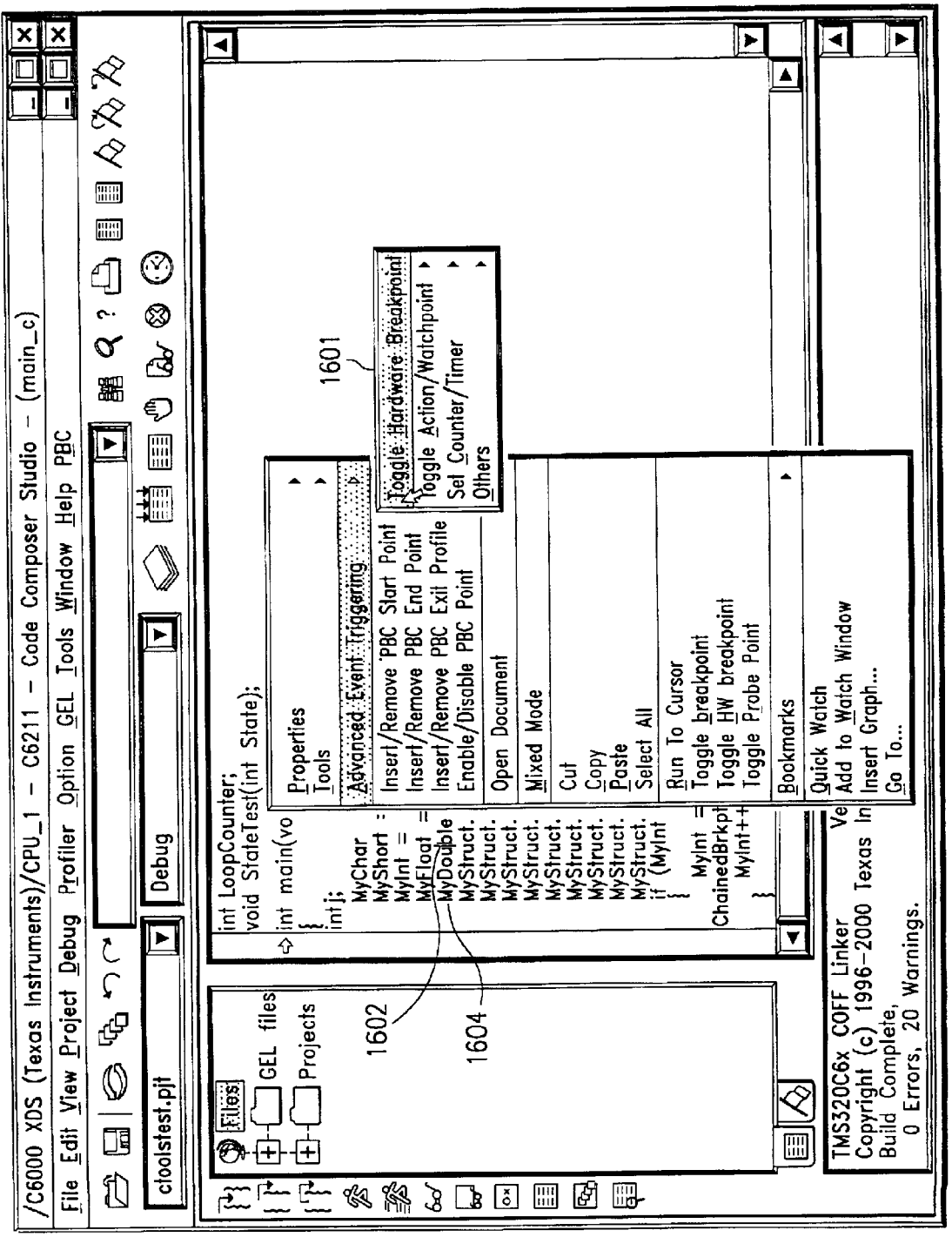
FIGS. 16A and 16B illustrate the method for dynamically determining relevant debugging information from the source code of the application program being debugged for a simple debug job.
Figure 16B:
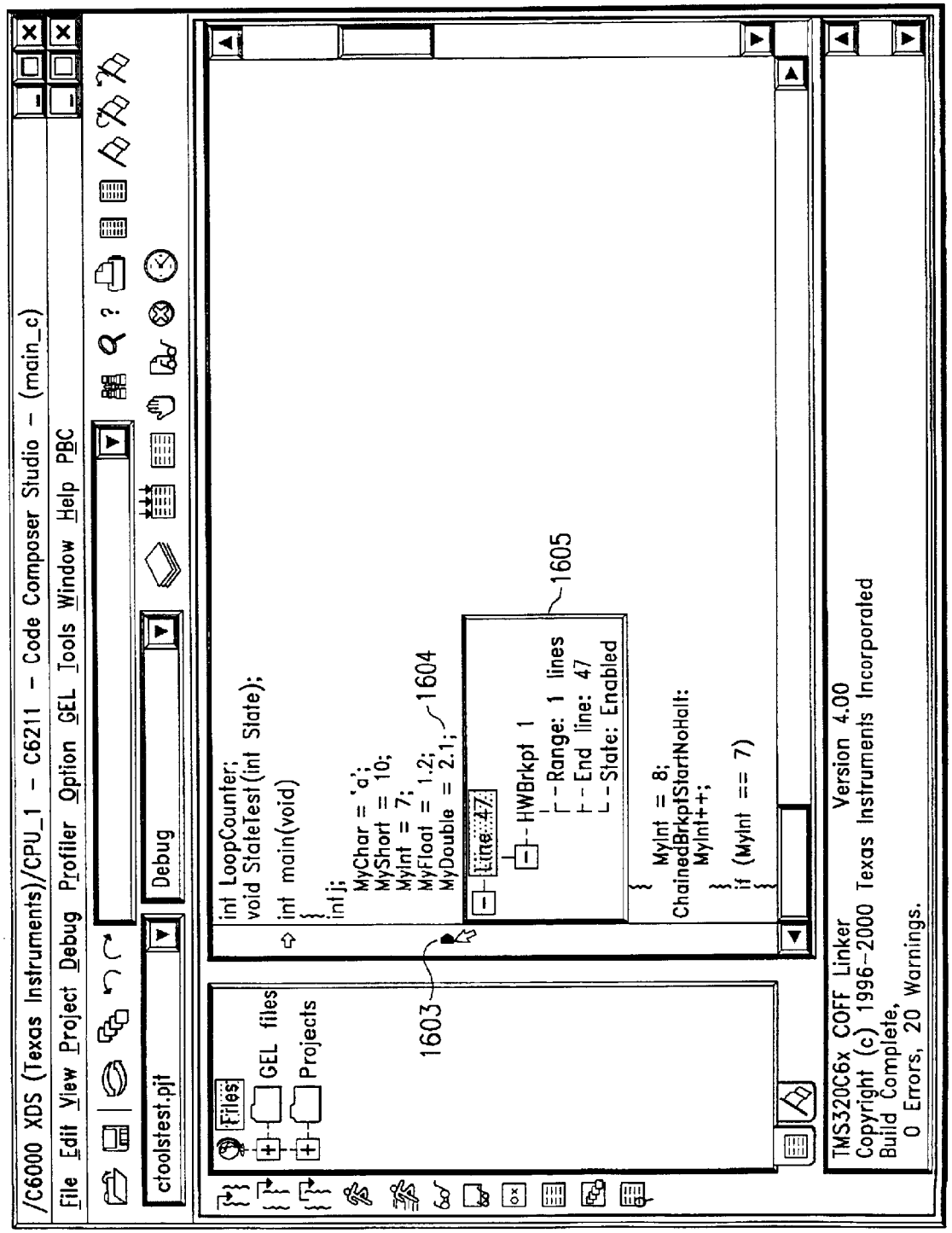

FIGS. 16A and 16B show the source edit window of FIG. 14 and illustrate dynamic determination of debugging info for a simple debug job. In FIG. 16A, a hardware breakpoint job is being selected from context sensitive menu 1601. The address at which the breakpoint is to occur is automatically determined from source code line 1604 indicated by cursor 1602. In FIG. 16B, when this job is successfully entered from the menu, indicator 1603 appears to the left of source code line 1604 to denote that a breakpoint has been set for that line. Clicking on indicator 1603 causes information box 1605 to be displayed. Information box 1605 contains the parameters of the breakpoint job that were automatically supplied by the source code object created when source code line 1604 was selected.

Figure 17A:
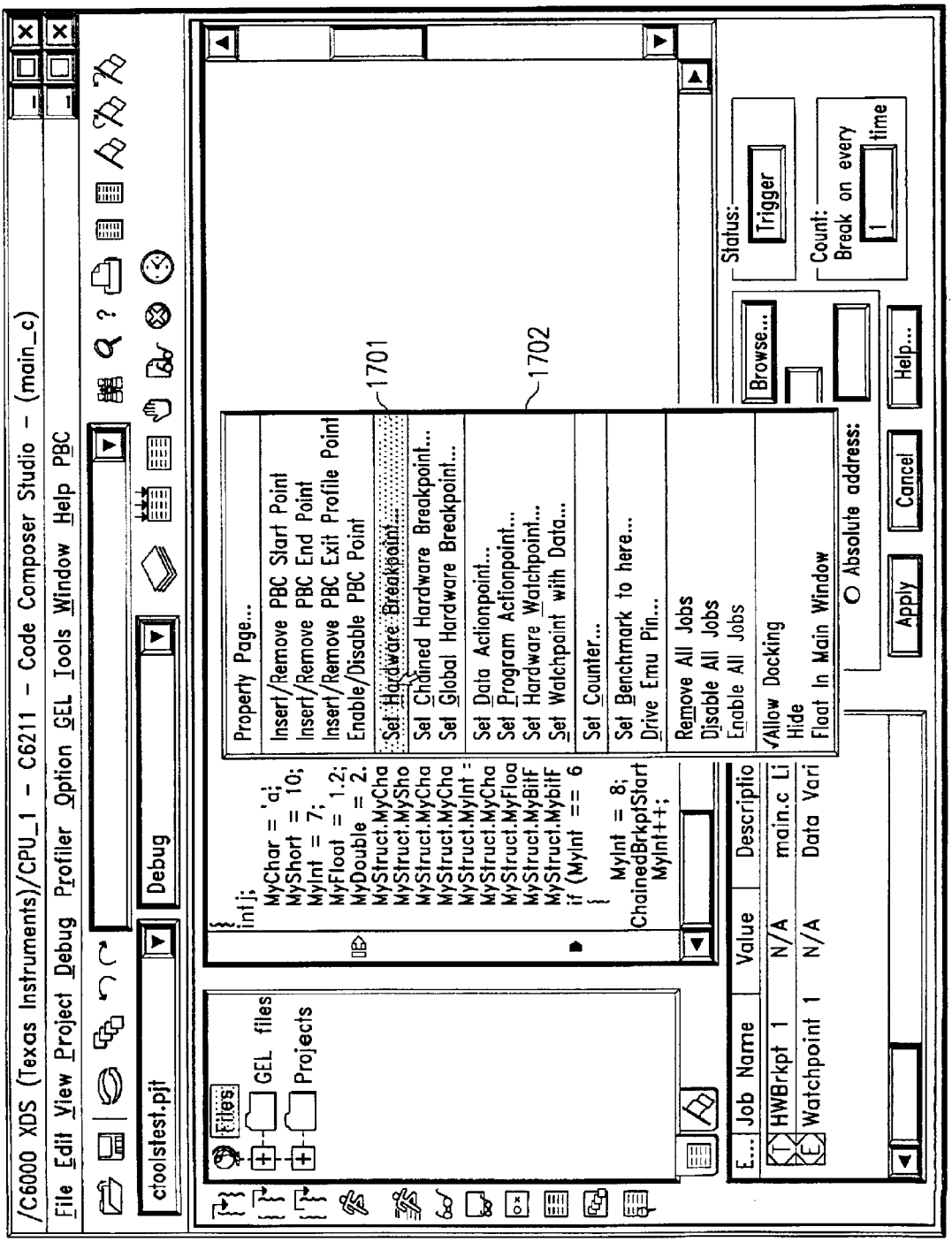
FIGS. 17A–D illustrate the method for dynamically determining relevant debugging information from the source code of the application program being debugged for a more complex debug job in which a source code object is used to fill in the job's parameters in a dialog box.
Figure 17B:
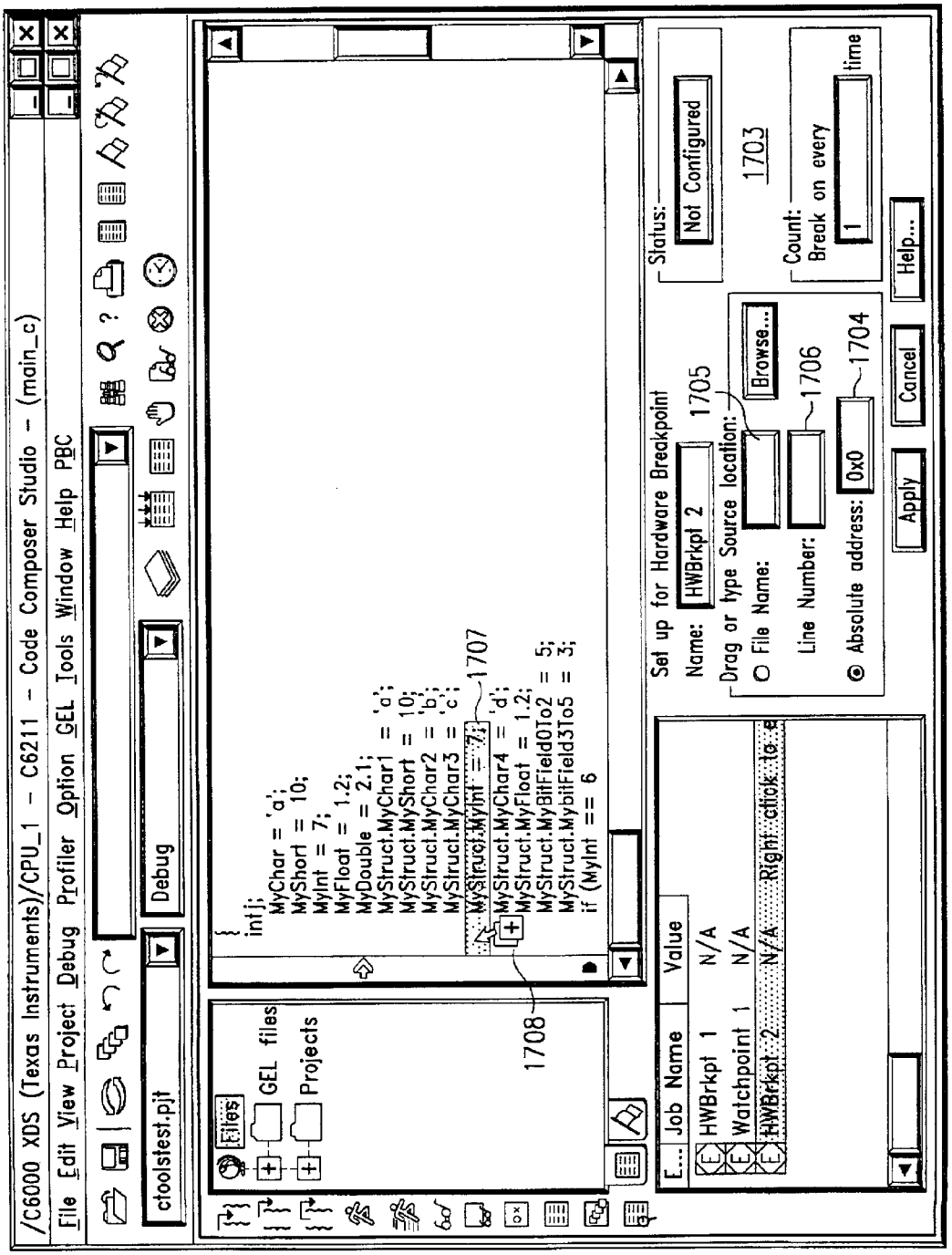
Figure 17C:
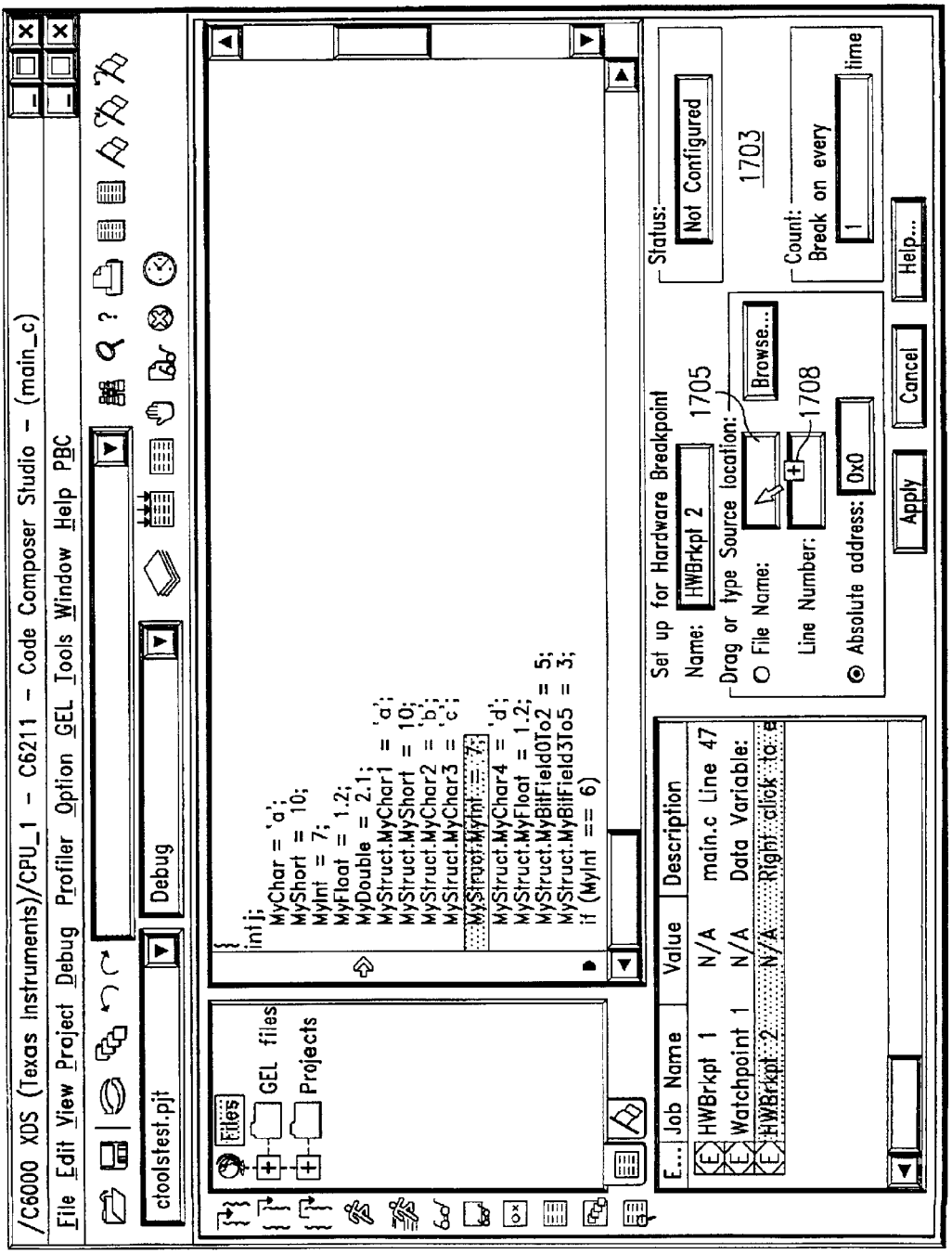
Figure 17D:
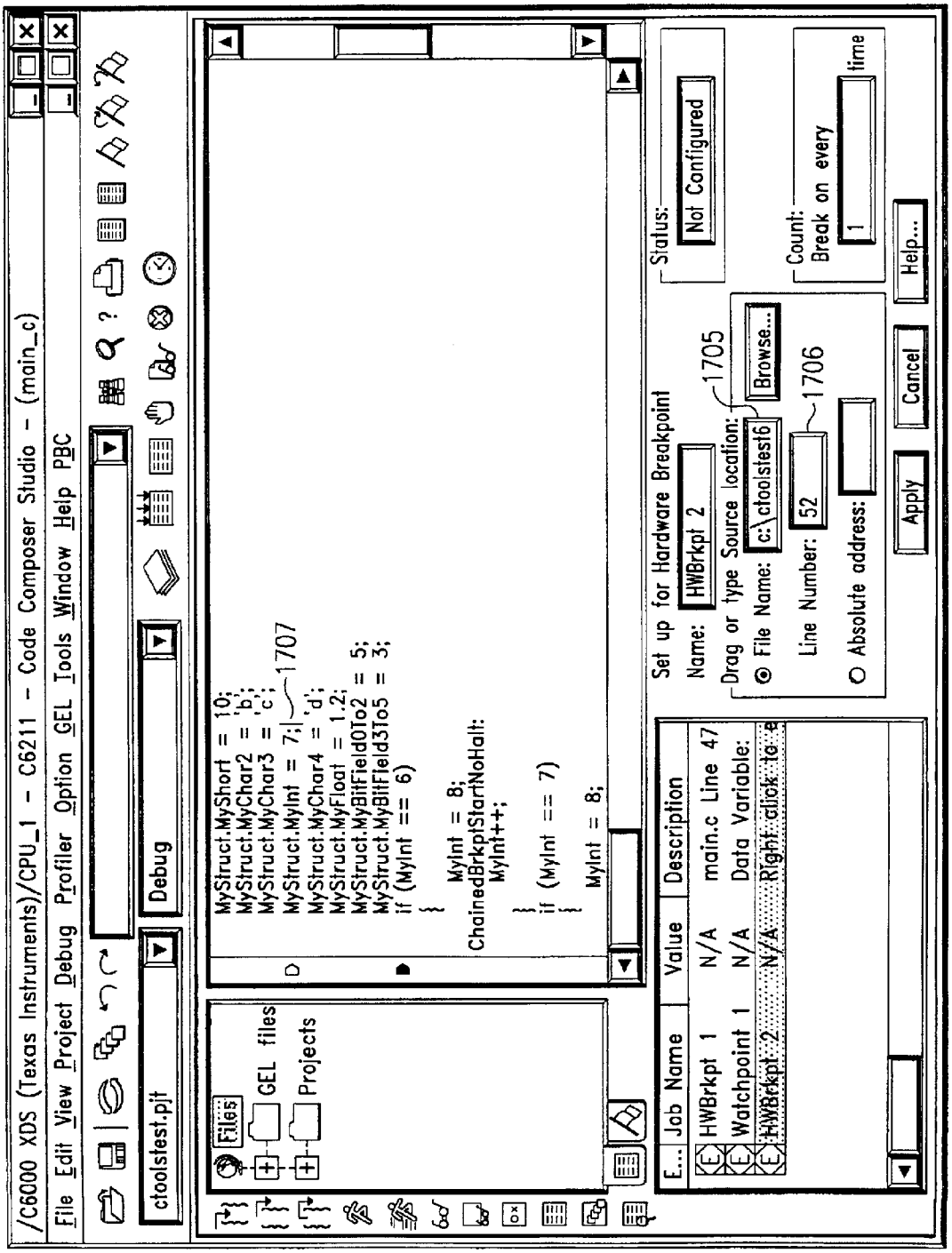

FIGS. 17A–D show the source edit window of FIGS. 16A–B and illustrate dynamic determination of debugging info for a more complex debug job in which a source code object is used to fill in the job's parameters in a dialog box. In FIG. 17A, a debug job Set Hardware Breakpoint 1701 is selected from menu 1702. Dialog box 1703 is displayed in the lower right corner of the window as illustrated in FIG. 17B. Note that absolute address parameter 1704 is currently 0×0 (the default) and file name parameter 1705 and line number 1706 are currently blank. To fill in these parameters, source code line 1707 is selected by depressing the left mouse button and keeping it depressed. This indicates that a drag and drop operation is desired. Drag and drop cursor 1708 appears to indicate that the system is ready to execute the operation. As shown in FIG. 17C, drag and drop cursor 1708 is moved to dialog window 1703 and placed over file name parameter 1705. The mouse button is then released and parameters 1705 and 1706 are automatically filed in from the information in the source code object associated with source code line 1707 as shown in FIG. 17D.

A problem arises if a user creates debug jobs and then makes modifications to the program to be debugged. In past software development systems, the user would be required to redefine any debug jobs that were affected by the modifications.

Figure 18:
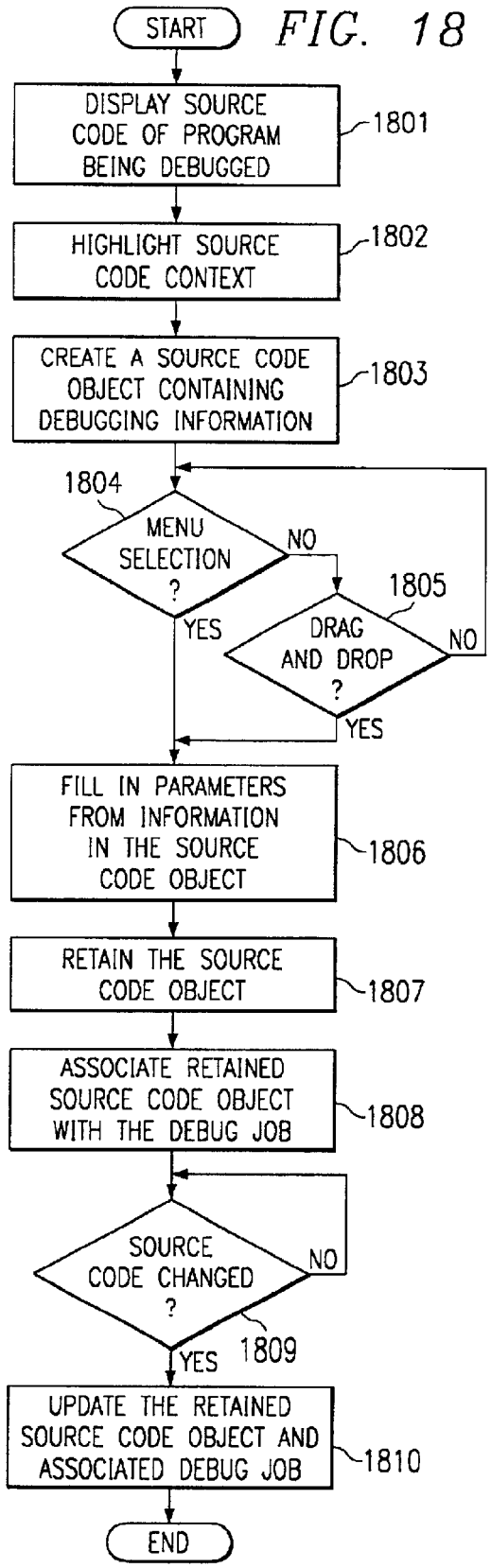
FIG. 18 presents a flow graph illustrating a method for dynamically updating debug jobs if the source code for the application program being debugged is changed.

FIG. 18 presents a flow graph illustrating a method for dynamically updating debug jobs if the source code for the program being debugged is changed. Steps 1801–1806 are identical to steps 1501–1506 as described with FIG. 15 above. In step 1807, the system retains the source code object created from the selected source code context. This source code object is associated with the debug job in step 1808. If the source code is modified as denoted in step 1809, the retained source code object and the associated debug job are updated to reflect the modification if it affects them in step 1810.

In an embodiment of the present invention, source and data objects supply the plugins with information about program locations and data expressions for selected source code contexts. If the user modifies the source code of the program being debugged, the source and data objects are automatically updated by the software development system if the modifications affect them. Before executing any active debug jobs, the plugin will validate the debug information for each job having associated source and data objects and update the debug jobs as required. Thus, debug jobs whose source and data object information has changed are automatically reprogrammed with the updated information and the user is not required to take any action. If it is not possible to reprogram a given debug job, the user is notified and the job is not executed.

Proactive Error Handling

Referring again to FIG. 12, in step 1205, the user is notified as to whether the requested job can be performed by the available debug components. This notification may indicate one of three things: the requested job can be performed; the requested job cannot be performed; or, the requested job could be performed but one or more of the debug components required by the job are in use by another job.

In an embodiment, if the requested job could be performed if one or more debug components were released by another debug job, the system aids the user in finding and deleting or disabling the debug jobs that are using the desired components rather than requiring the user to determine this information by trial and error.

Figure 19:
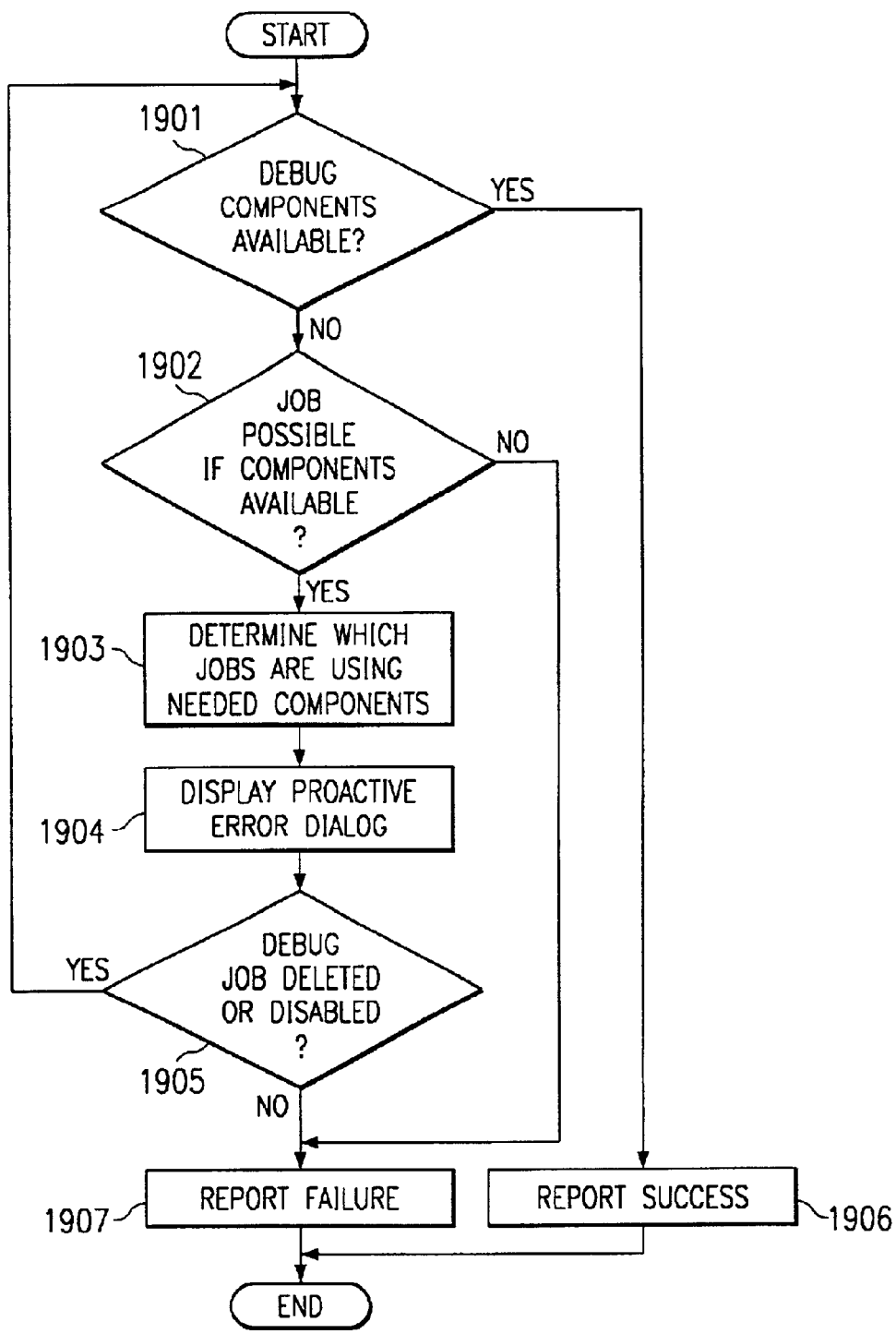
FIG. 19 presents a flow graph of a method for proactively allowing debug components already in use by other debugging jobs to be released for use in a new debugging job.

FIG. 19 presents a flow graph of a method for proactively allowing debug components already in use by other debugging jobs to be released for use in a new debugging job. In step 1901, the system determines if the debug components are available to accomplish the requested job. This is done by the wire list walking process described previously. If the components are available, step 1906 is executed to report success. Otherwise, the system determines if the job would be possible if the debug components were available in step 1902.

Within step 1902, the software creates a duplicate set of component modules that are all marked as being available. This duplicate set is searched by the wire list walking algorithm to determine if the job is possible with all debug components available.

If the answer to the test in step 1902 is negative, step 1907 is executed to report failure. Otherwise, the system then determines which existing debug jobs are using the needed components in step 1903. In step 1903, the software has found a group of components in the duplicate set required for the job. By comparing this set with the original set of debug component modules showing which components are assigned to existing jobs, a list of existing jobs using the required components is formed.

Step 1904 displays an error dialog to the user that contains a list of these conflicting debug jobs. The user now has the option to delete or disable one or more of the listed jobs in step 1905. If the user does delete or disable a job, processing continues at step 1901. Otherwise, failure is reported at step 1907.

Figure 20:
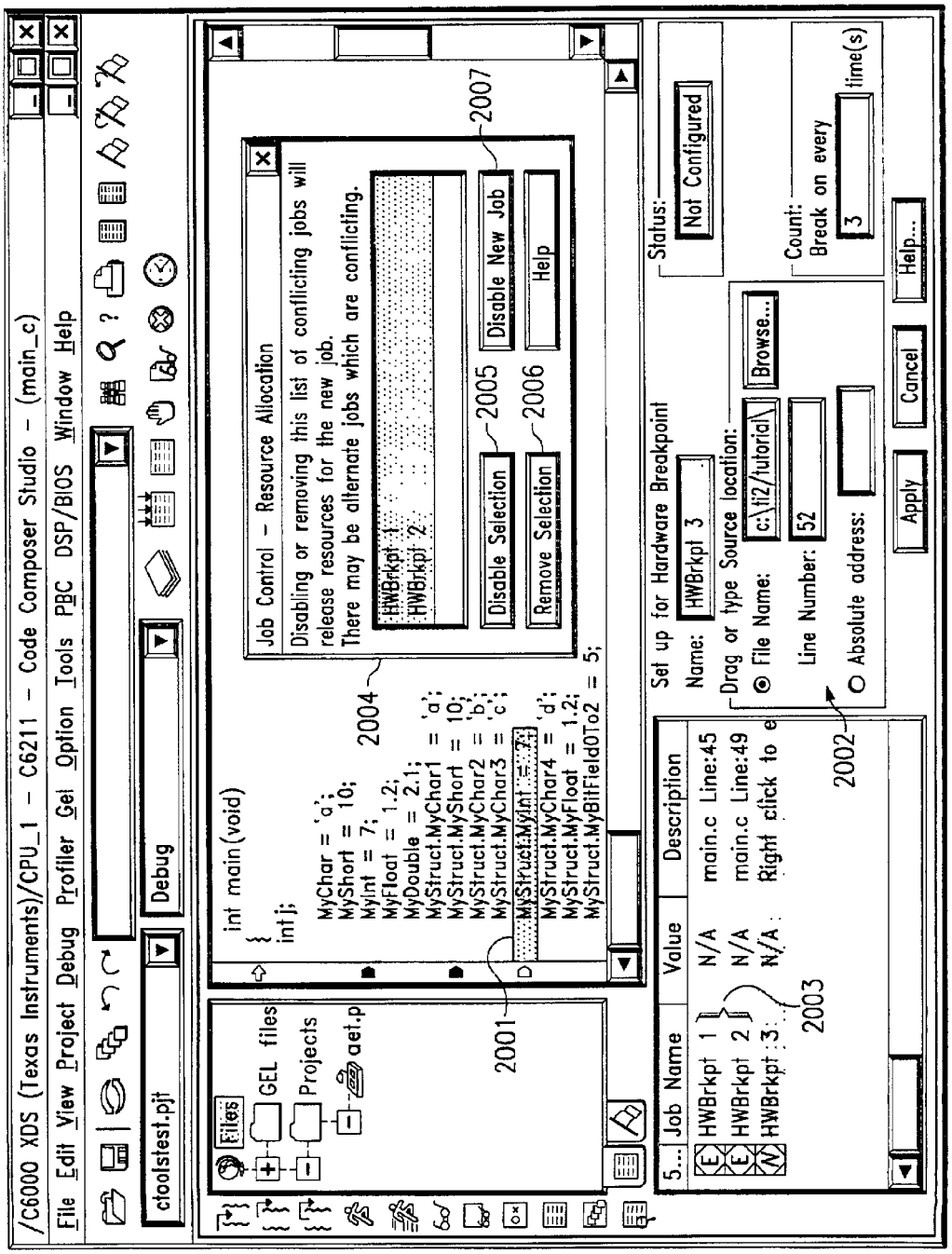
FIG. 20 presents an illustration the proactive error handling method of FIG. 19.

FIG. 20 presents an illustration of an embodiment of the proactive error handling method of FIG. 19. The user has attempted to define a hardware breakpoint at source code line 2001 using Hardware Breakpoint dialog 2002. The system has determined that all of the available hardware breakpoint debug components are currently in use by two other debug jobs 2003. Proactive Error Dialog 2004 has been displayed, listing the debug jobs 2003 that are using the required jobs. The user may now select one or more of the jobs and disable them by selecting button 2005 or remove them by selecting button 2006. Or the user may elect to disable the new debug job by selecting button 2007.

Analysis Trees

According to one embodiment of the present invention, all debug jobs are represented internally as analysis trees. This generic representation reinforces the separation between the user interface and the underlying software that actually identifies and programs the debug components. The tree represents a user-requested operation, not a specific set of instructions on how to program the hardware. All hardware specific information is confined to the very lowest level of the software architecture.

Figure 21:
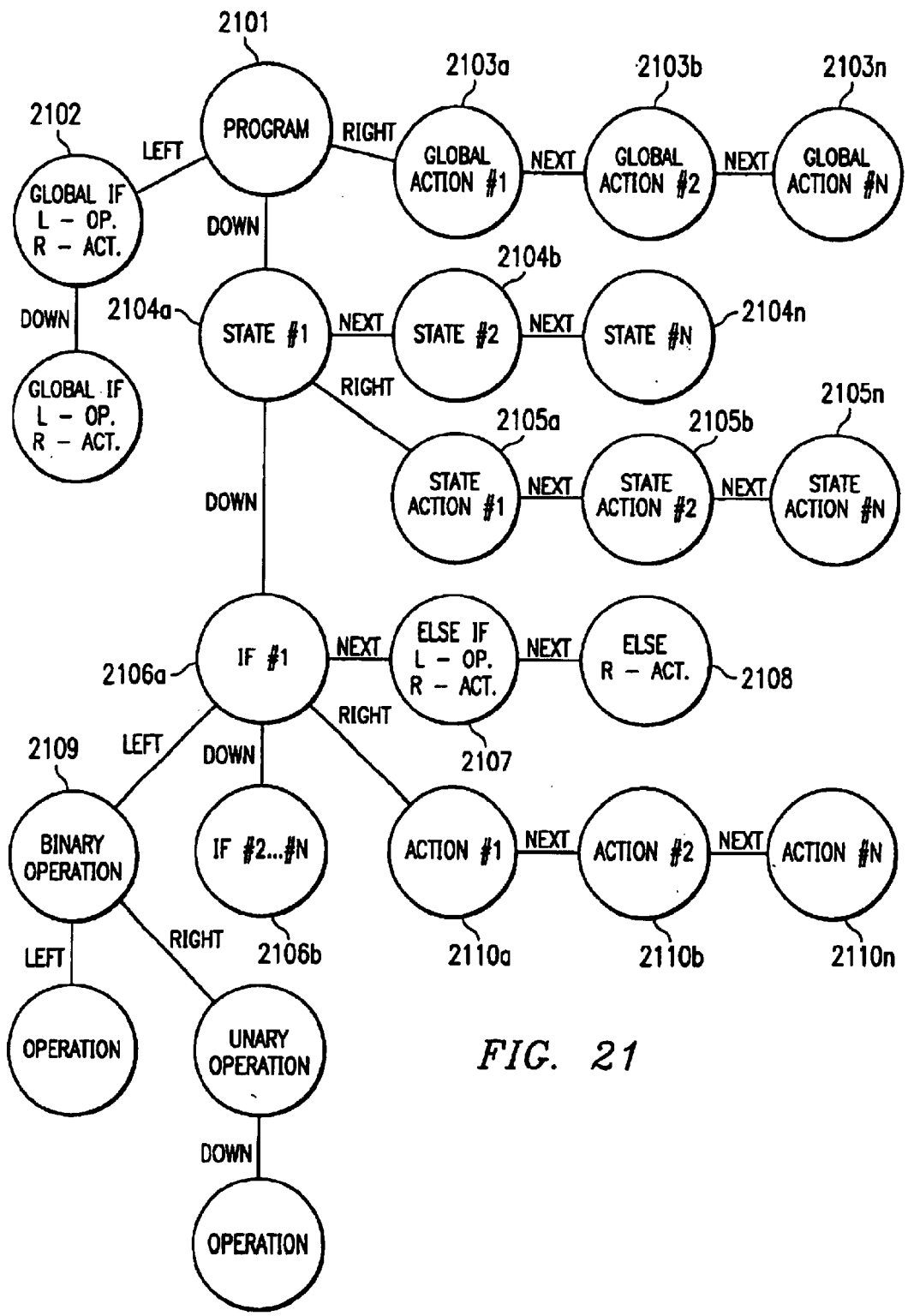
FIG. 21 presents a generic diagram of the analysis tree structure that is an internal representation of each debug job.

FIG. 21 presents a generic diagram of the analysis tree structure. Node 2101 is the root node of the tree. Node 2102 is a global If node corresponding to an If statement not tied to a state. These will always be left nodes of node 2101. Nodes 2103a–n are global action nodes. These are actions not tied to a state or to a global If statement. Nodes of this type will always be right nodes of node 2101. Nodes 2104a–n represent states. These nodes will always be down nodes of node 2101. Each state node 2104n may have down and right nodes as illustrated by those shown for node 2104a. Nodes 2105a–n are right nodes of 2104a. These represent actions to be performed each time the state represented by node 2104a is entered. The down node of node 2104a is If node 2106a. This node represents the first If statement in the state represented by 2104a. Additional If statements are represented by subsequent down nodes such as 2106b from If node 2106a. If node 2106a may have left, down, right, and next nodes. The left node will be a tree of operations as illustrated by node 2109 and its child nodes. These operation nodes may be !, &&, or || operators or comparison expressions. The right node is one or more action nodes 2110a–n representing a list of actions to perform when the If clause event condition is true. The next node may optionally represent an Elseif clause such as node 2107 or an Else clause such as node 2108.

Hardware System

Figure 22:
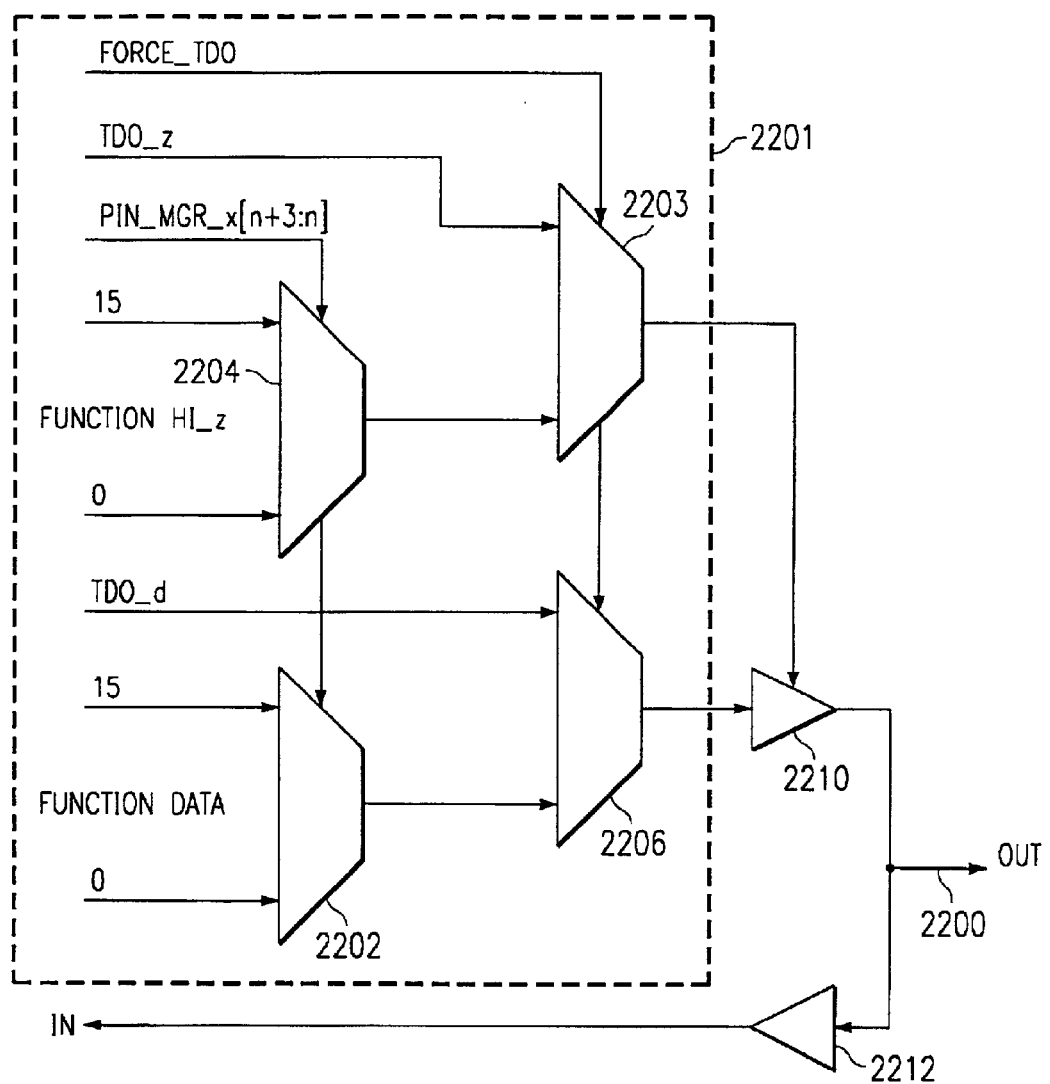
FIG. 22 is a schematic diagram of a configurable I/O pin on the target processor of FIG. 1A that can be configured by a software development system.

FIG. 22 is a schematic diagram of an embodiment of a configurable I/O pin on a target processor that can be configured by a software development system. The debug software system views pin manager 220 (see FIG. 2) as a group of pins that are controlled separately. Each pin 2200 and associated multiplex circuit 2201, as illustrated in FIG. 22, can multiplex from one to sixteen functions onto a debug test port pin. Each pin can have as few as three functions: function, zero, off or HI-Z; and as many as sixteen functions: function[3:0], zero, and off. Pin function selection multiplexors 2202, 2204 are controlled by four general purpose register bits Pin_Mgr_x[n+3:n] that are in a scan chain that receives debug commands from the software development system. Function data is connected to inputs of mux 2202, while corresponding output control signals Function_HI_Z are connected to inputs of mux 2204. Function_HI_z signals are also provided by a scan register in response to debug commands from the software development system. The output signal of mux 2204 and the TDO_z signals are applied to input terminals of mux 2203. The FORCE_TDO signal is applied to the control terminal of mux 2203. The output signal of mux 2202 and the TDO_d signals are applied to input terminals of mux 2206 while a signal from mux 2203 is applied to c control terminal of mux 2206. The output signal from mux 2206 is applied to an input terminal of amplifier 2210 while the output signal from mux 2203 is applied to a control terminal of amplifier 2210. The output signal from amplifier 2210 is applied to pin 2200 and to an input terminal of amplifier 2212. The output terminal of amplifier 2212 provides the IN signal.

Function signals in this embodiment include trace data outputs T[9:0], trace clock C[1:0], real time data transfer (RTDX) R[3:0] traditional EMU0/1, triggers X[1:0], high impedance off state Z and zero 0. Table 1 lists various ways in which the set of emulation pins EMU[9:0] and trace clock TR_CK[1:0] pins can be configured in this embodiment. Other embodiments may allow different combinations, or different numbers of pins, for example.

For a given hardware embodiment of pin manager 220, the debug components database includes the capabilities associated with each emulation pin. The debug software can therefore do the wire list walking from any given pin back toward the associated device core to determine if a requested debug function of the core can be provided at that pin. The availability of a particular core debug function at a particular pin may depend upon the current or requested configuration of the entire set of debug test port pins. Once the debug software has determined what the debug port pin configuration should be, it scans into a control register a code that selects the desired function at the respective pin multiplexers 2202, 2204.

Depending on what debug jobs are being performed, the pin manager can be configured to optimize trace data access by assigning all ten trace bits T[9:0] to test port pins EMU[9:0]. For another debug job, RTDX signals R[3:0] can be assigned to four test port pins, trigger signals X[1:0] assigned to two other test port pins, and only four trace bits T[3:0] selected, for example. Advantageously, the pin manager can be configured dynamically in response to various debug jobs. Likewise, pin managers having different implementations can be handled with appropriate entries in the debug component database associated with each implementation.

Figure 23:
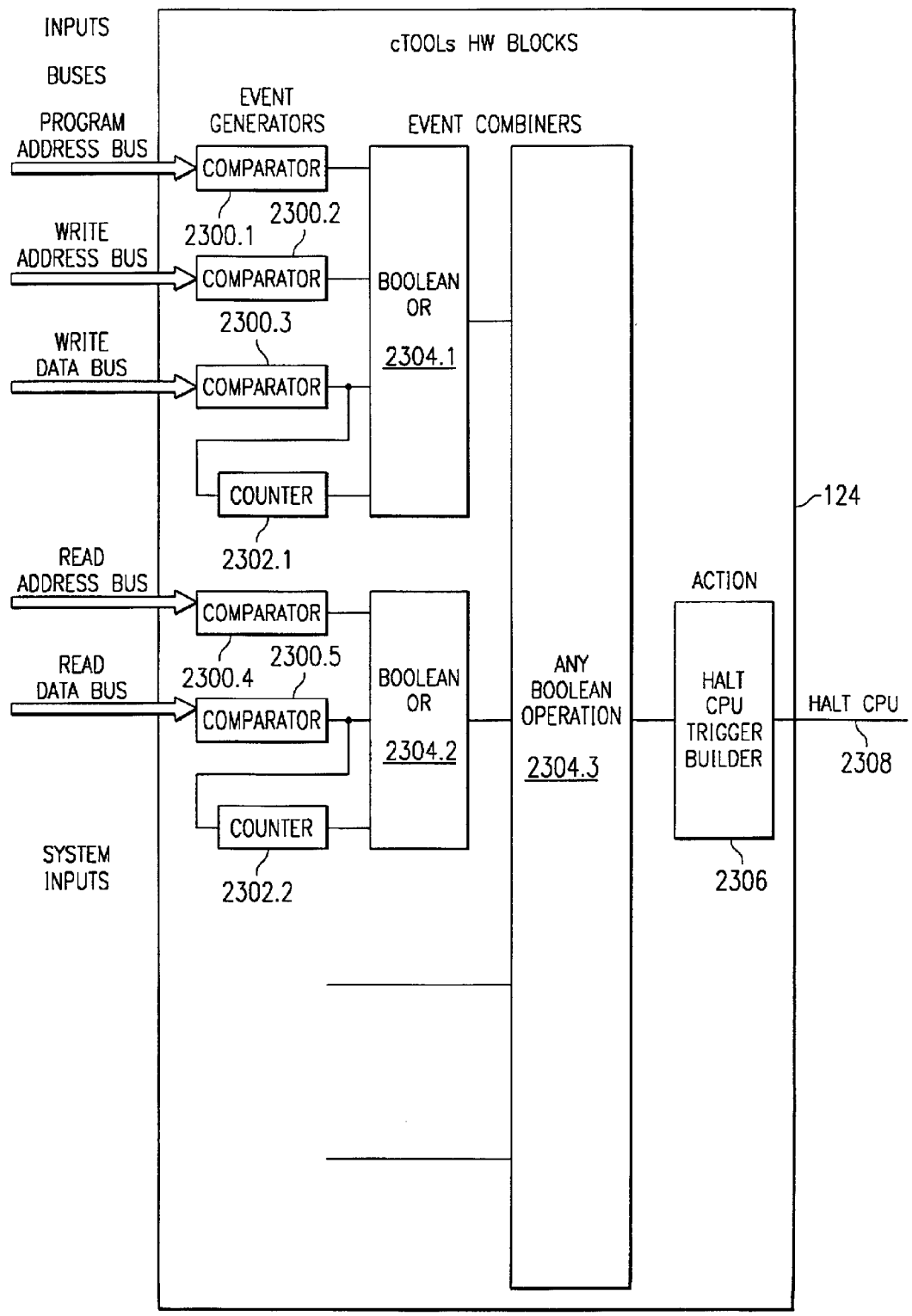
FIG. 23 is a block diagram illustrating a portion of a set of debug components provided by the target system of FIG. 1A.

FIG. 23 is a block diagram illustrating a portion of a set of debug components 124 provided by target system 103 of FIG. 1. Five comparators 2300.1-5 connected to monitor various buses within DSP core 120 are illustrated. Two counters 2302.1-2 are connected to two of the comparators to accumulate event counts. Boolean combinatorial OR circuits 2304.1-2 receive the outputs of the comparators and counters and combine selected inputs to create an output signal when a selected event or set of events occurs. Other similar sets of counters and Boolean circuits are provided, but not illustrated here for clarity. Boolean circuitry 2304.3 collects the outputs of the various OR gate circuits and combines selected inputs to create an output signal when a selected event or set of events occurs. Trigger building circuitry 2306 receives the output signal from the Boolean circuitry and generates a resultant trigger signal(HALT CPU) 2308. A trigger signal can be configured to halt the processor core, or connected to a selected emulation output pin, as discussed above.

The debug software can therefore do the wire list walking from any given pin back toward the associated device core using a debug component database corresponding to debug

TABLE 1

Emulation Pin Configurations

Multiplexor Selection

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| EMU0 | Z | 0 | T4 | T5 | T6 | T7 | T8 | T9 | E1 | E0 | R3 | R2 | R1 | R0 | X0 | X1 |
| EMU1 | Z | 0 | T4 | T5 | T6 | T7 | T8 | E1 | E0 | R3 | R2 | R1 | R0 | X0 | X1 | |
| EMU2 | Z | 0 | T4 | T5 | T6 | T7 | E1 | E0 | R3 | R2 | R1 | R0 | X0 | X1 | | |
| EMU3 | Z | 0 | T4 | T5 | T6 | E1 | E0 | R3 | R2 | R1 | R0 | X0 | X1 | | | |
| EMU4 | Z | 0 | T4 | T5 | E1 | E0 | R3 | R2 | R1 | R0 | X0 | X1 | | | | |
| EMU5 | Z | 0 | T4 | E1 | E0 | R3 | R2 | R1 | R0 | X0 | X1 | | | | | |
| EMU6 | Z | 0 | T3 | | | | | | | | | | | | | |
| EMU7 | Z | 0 | T2 | | | | | | | | | | | | | |
| EMU8 | Z | 0 | T1 | | | | | | | | | | | | | |
| EMU9 | Z | 0 | T0 | | | | | | | | | | | | | |
| CK1 | Z | 0 | C1 | T9 | E0 | E1 | R0 | X0 | X1 | | | | | | | |
| CK0 | Z | 0 | C0 | | | | | | | | | | | | | | components 124 to determine if a requested debug function of the core can be provided using debug components 124. The availability of a particular core debug function at a particular pin may depend upon the current or requested configuration of the entire set of debug test port pins and debug components. Once the debug software has determined what the debug component configuration should be, it scans into a control register a code that selects the desired function at the respective pin multiplexers 2202, 2204.

Figure 24:
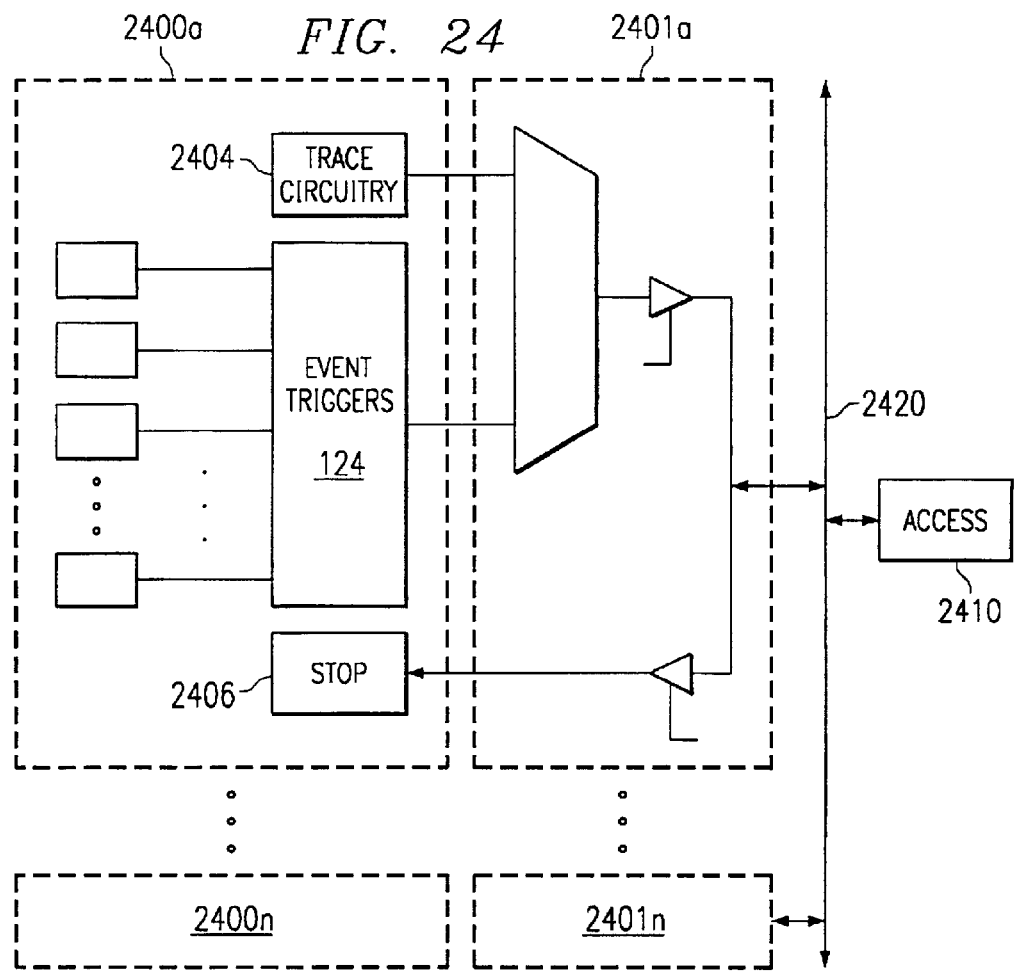
FIG. 24 is a block diagram of a system with several megacells each with their own set of debug components interconnected on a single integrated circuit such that all of the debug components are controlled by the software development system of FIG. 1A using a combined wire list.

FIG. 24 is a block diagram of a system with several megacells 2400a–2400n each with their own set of debug components 124 including trace circuitry 2404 interconnected on a single integrated circuit such that all of the debug components are controlled by the software development system of FIG. 1A using a combined wire list. Pin circuitry 2400a–2400n is representative of the configurable I/O pins of FIG. 22. Each megacell 2400n has an associated debug component database that describes its debug components and interconnections, as discussed previously. Advantageously, each debug component database is independent and does not need to include information pertaining to other megacells.

For debugging, the system is connected to the software development system via access circuitry 2410, as described previously. The access circuitry 2410 is coupled to bus 2420. Bus 2420 is coupled to each megacell 2400a through 2400n by circuits 2401a through 2401n respectively. Each megacell debug component database is examined by the software and a single software representation is formed that includes all of the debug components from all of the megacells. Advantageously, a debug operation can be performed that includes debug components selected from one or more of the megacells by examining this single software representation of all of the debug components and thereby walking the combined wire list. For example, a trigger event can be selected from megacell 2400n and directed to stop circuitry 2406 in megacell 2400a in order to stop a processor in megacell 2400a in response to an event that occurs in megacell 2400n.

Figure 25:
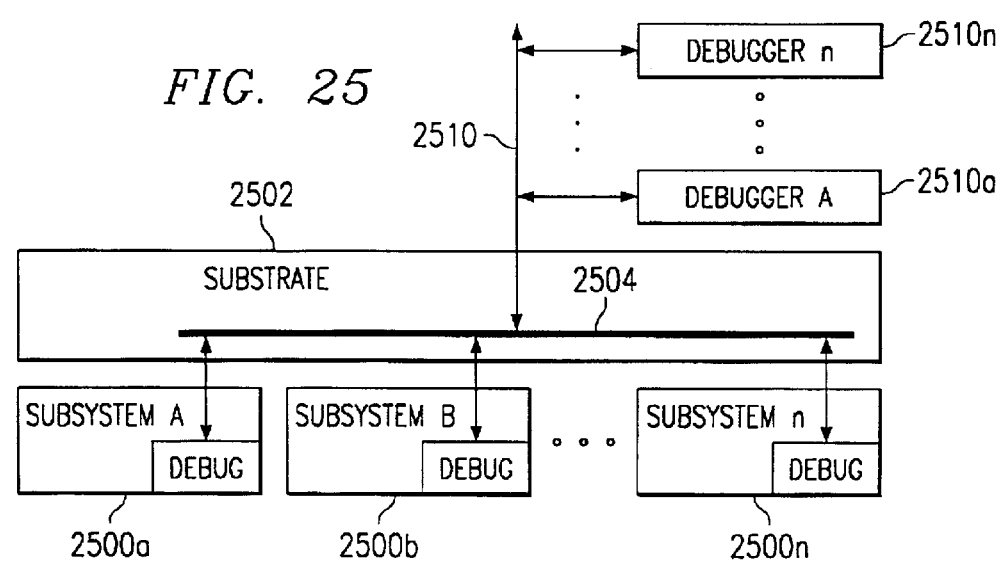
FIG. 25 is a block diagram of a system with several subsystems interconnected on a substrate each with their own set of debug components such that all of the debug components are controlled by the software development system of FIG. 1A using a combined wire list.

FIG. 25 is a block diagram of a system with several subsystems 2500a–2500n interconnected by bus 2504 on a substrate 2402 each with their own set of debug components such that all of the debug components are controlled by the software development system of FIG. 1A using a combined wire list. Each subsystem is representative of a system as shown in FIG. 24 with one or more included megacells. In this embodiment, the substrate 2502 is a printed circuit board and each subsystem is contained within separate integrated circuits. Other embodiments may employ other types of substrates, such as ceramic or flexible film, for example. Other embodiments may package the subsystem in different manners, such as direct attachment to the substrate, for example.

Each subsystem 2500n has one or more associated debug component databases that describes the debug components and interconnections of the included megacells, as discussed previously. Advantageously, each debug component database is independent and does not need to include information pertaining to other megacells or the other subsystems.

For debugging, the system is connected to the software development system via access circuitry 2510a, as described previously. Advantageously, several access circuits represented by 2510n may be connected in order to provide a higher bandwidth, for example. Each megacell debug component database is examined by the software and a single software representation is formed that includes all of the debug components from all of the subsystems. Each access circuit also has an associated debug component database that is included in the software representation formed by the software development system. Advantageously, a debug operation can be performed that includes debug components selected from one or more of the subsystems and access circuits by examining this single software representation of all of the debug components and thereby walking the combined wire list.

Batch Debugging Language

According to one embodiment of the present invention, a language is defined to provide a means for specifying batch tests for debugging the lower levels of the software development tool and to allow a developer to test debug component hardware. This language is parsed into analysis trees as described above that are passed as parameters to the software development system through a special interface to the low level software that interfaces directly to the debug components. This language is presented in more detail in Appendix A of co-related U.S. patent application Ser. No. 09/798,173 and is incorporated herein by reference.

Thus, a system and methods have been described to provide a software development system and a user interface that has a software centric view. The present invention provides a significant advantage over the prior art. Advantageously, the software system can automatically adapt itself to a hardware environment as each environment is described by a database that defines the capabilities of that hardware. The software system does not need to be modified each time a new hardware environment is created.

Advantageously, the user interface of the software system can be configured to present only a set of activities that are possible in accordance with the set of operational capabilities of the hardware environment. The user is not presented with options for capabilities that are not present. And, as components in the hardware environment are assigned to user defined jobs, the software system dynamically updates the user interface to inform the user that certain activities are no longer possible because the components needed are in use.

The present invention is discussed in conjunction with software/hardware debugging. However, it has applications that extend beyond debugging. While the invention has been described with reference to illustrative embodiments, this description should not be construed in a limiting sense. Various other embodiments of the invention will be apparent to persons skilled in the art upon reference to this description.

For example, other operating capabilities of various hardware resources of a test bed system can be included in a debug component database and used by the software to configure the test bed system. These hardware resources can be logic analyzers, signal generators, oscilloscopes, etc., for example.

Software systems that are not concerned with software development can also benefit from aspects of the present invention. A software system that is intended to operate in conjunction with various sets of hardware resources can benefit from self-configuring aspects described herein. One example is a medical system that includes various and changing medical devices. Another example is a production system that incorporates various and changing production machinery, or a single production machine that can be fitted with various and changeable tools and implements. Another example is an automotive control system in which various driver displays and menus are presented in accordance with various and changeable optional equipment. Thus, the present invention pertains to systems in which the ability to perform a requested job may vary depending on the presence and availability of resources. Thus, in these other types of systems, the term "debug component database" should be interpreted to mean a resource database.

As used herein, the term "database" is not intended to be limiting. The debug component database may be in a form other than a classical database, and can be any type of description that conveys the function and interconnection of the various debug components.

As used herein, the term "debug" is not intended to be limiting. Debug operations refer to any of the sort of tasks performed during development of software and/or hardware, including hardware emulation.

It is therefore contemplated that the appended claims will cover any such modifications of the embodiments as fall within the true scope and spirit of the invention.

What is claimed is:

1. A method for dynamically varying context sensitive menus of a context-independent software system, the method comprising:
   adding a first context-dependent software menu item to a first context sensitive menu of a graphical user interface (GUI) in response to a call to the software system from a first subsystem module;
   analyzing the capabilities of the first menu item by a second subsystem module in response to a query from the software system;
   receiving an activation event for the first context sensitive menu from the GUI;
   displaying the first menu item as either active or inactive based on a response to the query from the software system to the second subsystem module; and
   executing an action associated with the first menu item as specified by the first subsystem module when the first menu item is selected only if the first menu item is active.

2. The method of claim 1 wherein:
   adding a first menu item comprises a step of calling the software system from the first subsystem module with a call that includes sending two functions as parameters,
   displaying comprises a step of calling a first of the two functions to determine if the first menu item should be displayed as active or inactive; and
   executing comprises a step of calling a second of the two functions to invoke the action associated with the first menu item.

3. The method as recited in claim 1, in which the step of adding a first menu item comprises:
   determining if a resource is present to perform the action associated with first menu item; and
   adding the first menu item to the first context sensitive menu only if the resource is present.

4. The method as recited in claim 3, in which the software system is a software development system, and wherein the step of determining if a resource is available comprises:
   accessing a first database corresponding to a first hardware system selected from the multiple hardware system architectures for use during a software debug session;
   creating a software representation for use by the software development system of a set of debug components of the first hardware system in accordance with the first database such that interconnections of the set of debug components are also represented; and
   traversing the software representation of the first set of debug components to determine if a first debug component required to execute the action associated with the first menu item is present in the first hardware system.

5. The method as recited in claim 1 wherein the call to the software system is accomplished through an object request broker.

6. The method as recited in claim 1 wherein the call to the software system is accomplished through a common object management interface.

7. The method as recited in claim 1 in which the software system is a software development system.

8. The method as recited in claim 7, wherein the first subsystem module comprises debug software.

9. The method as recited in claim 8, further comprising
   displaying the source code of an application program in a source code window of the GUI; and
   displaying the first context sensitive menu with a first set of menu items including the first menu item in response to selection of a first element in the source code window, wherein the first menu item is displayed in an active state; and
   displaying the first context sensitive menu with the first menu item displayed in an inactive state in response to selection of a second element in the source code window.

10. The method of claim 9, wherein the first element is a data element of the source code and the second element is a line or block of source code.

11. A software development system, the system comprising:
   a memory storage system holding a software development tool program;
   a host computer connected to the memory storage system, the host computer operable to execute the software development tool program;
   an access mechanism for connecting to a hardware system, the hardware system being operable to execute an application program; and
   wherein the context-independent software development tool is operable to support a plurality of hardware system architectures by using a method for dynamically varying context sensitive menus, the method comprising:
      adding a first menu item to a first context sensitive menu of a graphical user interface (GUI) in response to a call to the software developments system from a context independent first subsystem module;
      analyzing the capabilities of the first menu item by a second subsystem module in response to a query from the software system;
      receiving an activation event for the first context sensitive menu from the GUI;
      displaying the first menu item as either active or inactive based on a response to the query from the software development system to the second subsystem module; and
      executing a debug action associated with the first menu item as specified by the first subsystem module when a first menu item pick event is received from the GUI by sending a debug command to a first hardware system via the test port to initialize a set of debug components while executing the application program on the first hardware system.

12. The software development system as recited in claim 11, wherein the access mechanism comprises a test port.

13. A digital system comprising:

a microprocessor connected to a memory module for holding a software program, the microprocessor operable to execute the software program;

a set of functional debug components connected to the microprocessor for monitoring at least a first parameter during execution of the software program, the set of functional debug components being configurable in response to a debug command;

a test port connected to the set of functional debug components, the test port operable to receive debug commands from a software development system on a host processor; and wherein a first debug command is provided using a method for dynamically varying context sensitive menus, the method comprising:

adding the first debug command to a first context sensitive menu of a graphical user interface (GUI) in response to a call to the software developments system from a context-independent first subsystem module;

receiving an activation event for the first context sensitive menu from the GUI;

analyzing the capabilities of the first menu item by a second subsystem module in response to a query from the software system;

displaying the first debug command as either active or inactive based on a response to the query from the software development system to a the second subsystem module; and executing a debug action associated with the first debug command as specified by the first subsystem module when a first debug command pick event is received from the GUI by sending the first debug command to a first hardware system via the test port to initialize a set of debug components while executing the application program on the first hardware system.

14. A digital system, comprising:

a microprocessor having a first architecture for executing application programs;

a memory circuit connected to the microprocessor holding a first application program for execution by the microprocessor; and wherein the first application program was developed with a software development system using a method for dynamically varying context sensitive menus, the method comprising:

adding a first menu item to a first context sensitive menu of a graphical user interface (GUI) in response to a call to the software developments system from a context-independent first subsystem module;

receiving an activation event for the first context sensitive menu from the GUI;

analyzing the capabilities of the first menu item by a second subsystem module in response to a query from the software system;

displaying the first menu item as either active or inactive based on a response to the query from the software development system to the second subsystem module; and executing a debug action associated with the first menu item as specified by the first subsystem module when a first menu item pick event is received from the GUI by sending a debug command to a first hardware system via a test port to initialize a set of debug components while executing the application program on the first hardware system.

* * * * *